United States Patent
Koshy et al.

(10) Patent No.: US 10,218,403 B2
(45) Date of Patent: Feb. 26, 2019

(54) SYSTEM AND METHOD FOR A MODULAR DYNAMIC WIRELESS POWER CONTROL SYSTEM IN A CONVERTIBLE INFORMATION HANDLING SYSTEM

(71) Applicant: Dell Products, LP, Round Rock, TX (US)

(72) Inventors: Kamal J. Koshy, Austin, TX (US); Benny J. Bologna, Austin, TX (US); Ching Wei Chang, Austin, TX (US); Nicholas D. Grobelny, Austin, TX (US); Geroncio O. Tan, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 10 days.

(21) Appl. No.: 15/663,766

(22) Filed: Jul. 30, 2017

(65) Prior Publication Data

US 2019/0036563 A1 Jan. 31, 2019

(51) Int. Cl.
*H04B 1/3827* (2015.01)
*H04W 52/18* (2009.01)
*H04W 88/06* (2009.01)

(52) U.S. Cl.
CPC .......... *H04B 1/3838* (2013.01); *H04W 52/18* (2013.01); *H04W 88/06* (2013.01)

(58) Field of Classification Search
CPC combination set(s) only.
See application file for complete search history.

(56) References Cited

U.S. PATENT DOCUMENTS

| 6,377,608 B1* | 4/2002 | Zyren | H04W 72/02 375/132 |
| 6,978,126 B1* | 12/2005 | Blaker | G07C 9/00309 340/4.3 |

(Continued)

OTHER PUBLICATIONS

Revolution Wi-fi, "Wake on Wireless LAN," Nov. 8, 2010, 6 pages, http://www.revolutionwifi.net/revolutionwifi/2010/11/wake-on-wireless-lan.html?rq=Wake%20on%20Wireless%20Lan.

(Continued)

*Primary Examiner* — Nay A Maung
*Assistant Examiner* — Erica L Fleming-Hall
(74) *Attorney, Agent, or Firm* — Prol Intellectual Property Law, PLLC; H. Kenneth Prol

(57) ABSTRACT

A system and method operating a convertible information handling system comprising a processor executing code instructions for a modular dynamic wireless power control system for detecting an active wireless link operating via an antenna system and a first orientation mode, wherein the transmission power of the antenna system is limited to a regulatory safety maximum depending on orientation, the processor determining the permitted regulatory safety maximum transmission power for the first orientation mode for the information handling system and the processor determining relative transmission activity levels for the information handling system relative to the first active wireless link and the second active wireless link, including a first wireless link data rate transmission level for the first antenna system and a second wireless link data rate transmission level for the second antenna system. The modular dynamic wireless power control system instructing the wireless interface adapter controller to increase transmission power to the first antenna and decrease transmission power to the second antenna relative to the regulatory safety maximum power (Continued)

level when the first wireless link data rate transmission level is greater than the second wireless link data rate transmission level.

20 Claims, 12 Drawing Sheets

(56) References Cited

U.S. PATENT DOCUMENTS

| | | | |
|---|---|---|---|
| 7,324,824 B2 | 1/2008 | Smith | |
| 8,577,289 B2 | 11/2013 | Schlub | |
| 8,811,918 B2 | 8/2014 | Rath | |
| 8,825,102 B2 | 9/2014 | Chakraborty | |
| 8,971,826 B2 | 3/2015 | Abdul-Gaffoor | |
| 2005/0250528 A1* | 11/2005 | Song | H04W 52/32 455/522 |
| 2008/0270814 A1 | 10/2008 | Starr | |
| 2009/0305742 A1* | 12/2009 | Caballero | H04B 1/3838 455/566 |
| 2010/0164720 A1 | 7/2010 | Kore | |
| 2011/0034135 A1 | 2/2011 | Ali | |
| 2011/0087903 A1* | 4/2011 | MacDougall | G06F 1/26 713/310 |
| 2012/0003933 A1 | 1/2012 | Baker | |
| 2012/0021800 A1* | 1/2012 | Wilson | H04W 52/146 455/550.1 |
| 2012/0093141 A1 | 4/2012 | Imes | |
| 2012/0147274 A1* | 6/2012 | Hassan | H04L 1/0033 348/729 |
| 2013/0237272 A1* | 9/2013 | Prasad | H04B 7/0617 455/517 |
| 2013/0252657 A1* | 9/2013 | Kafle | H04W 52/367 455/522 |
| 2014/0003361 A1* | 1/2014 | Song | H04W 16/14 370/329 |
| 2014/0213192 A1 | 7/2014 | Lagnado | |
| 2014/0351654 A1 | 11/2014 | Zhang | |
| 2014/0357313 A1 | 12/2014 | Mercer | |
| 2015/0341869 A1* | 11/2015 | Sen | H04W 52/34 455/522 |
| 2015/0382307 A1* | 12/2015 | Harper | H04W 52/246 455/103 |
| 2016/0164563 A1 | 6/2016 | Khawand | |
| 2017/0187412 A1* | 6/2017 | Han | H04B 17/102 |
| 2018/0007644 A1* | 1/2018 | Zhao | H04W 16/14 |
| 2018/0084562 A1* | 3/2018 | Ramamurthi | H04W 72/085 |
| 2018/0262267 A1* | 9/2018 | Jackson | H04B 7/2606 |

OTHER PUBLICATIONS

Kevin Purdy, Lifehacker.com, "Rule Your Computer From Afar be Setting Up Wake-on-LAN," Mar. 29, 2011, 4 pages, http://lifehacker.com/5786791/rule-your-computer-from-afar-by-setting-up-wake-on-lan.

FCC / OET Laboratory Division, "Draft Laboratory Division Publications Report: SAR Evaluation Considerations for Laptop, Notebook, Netbook, & Tablet Computers," Apr. 23, 2012, 13 pages, https://apps.fcc.gov/eas/comments/GetPublishedDocument.html?id=247&tn=760076.

* cited by examiner

US 10,218,403 B2

SYSTEM AND METHOD FOR A MODULAR DYNAMIC WIRELESS POWER CONTROL SYSTEM IN A CONVERTIBLE INFORMATION HANDLING SYSTEM

FIELD OF THE DISCLOSURE

The present disclosure generally relates to a method and apparatus for control of wireless transmit power levels of antenna systems in compliance with regulatory specific absorption rate (SAR) requirements for information handling systems convertible to one or more orientation modes.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, and networking systems. Information handling systems can also implement various virtualized architectures. Data communications among information handling systems may be via networks that are wired, wireless, optical or some combination. For wireless communications, one or more wireless interface adapters may be used including antenna systems, a front end antenna module and other radio frequency subsystems. Several available radiofrequency communication platforms in information handling systems may be operating simultaneously for data and other communications with other users via communication and data networks. As a result of wireless transmission, levels of transmission power may be limited during operation depending on SAR regulatory limits and these differ depending on type of information handling system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIGS. 9-1 and 9-2 are a flow diagram illustrating a method of modular dynamic wireless power control to maintain regulatory SAR levels for an information handling system according to another embodiment of the present disclosure.

DETAILED DESCRIPTION OF THE DRAWINGS

Figure 1:
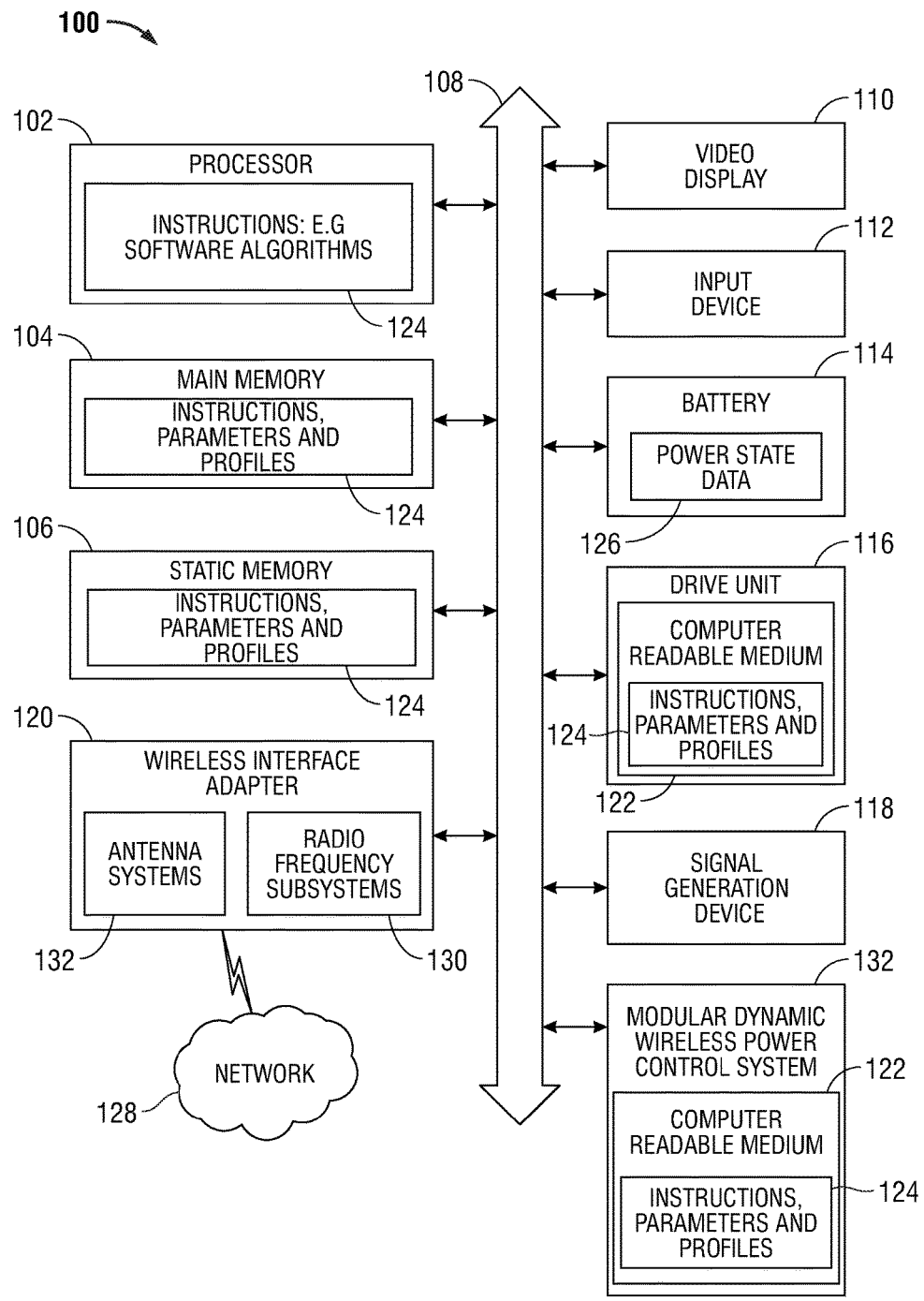
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality. The information handling system may be of a variety of models and types. For example, a personal computer may be a laptop, a 360 convertible computing device, a tablet, smart phone, wearable computing device, or other mobile information handling system and may have several configurations and orientation modes. The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. In an aspect, the information handling system may have a plurality of antenna systems for communication via wireless links operating on a variety of radio access technologies (RAT). In another aspect, several antenna systems may be available for each RAT to enable aggregated data communications such as via plural multiple in, multiple out (MIMO) streams to enhance bandwidth or reliability. Antenna systems may be operated via one or more wireless adapters that may include controllers, memory and other subsystems some of which may operate as a radio frequency (RF) front end for one or more antenna system to transmit wirelessly. Portions of an information handling system may themselves be considered information handling systems.

In aspects of the present disclosure, an information handling system 100 may be a convertible information handling system capable of being changed between one or more types of information handling systems. For example, a convertible information handling system may be referred to as a convertible laptop or 2-in-1 computing device whereby a hinge between a tablet head portion with a display screen may be hinged to a keyboard or another display screen base. The convertible information handling system may have a 360 degree hinge and may be used in a laptop configuration, may be used folded around as a tablet device, or may be used in various other configurations which may also be referred to herein as orientation modes. Orientation modes may include a laptop mode, tablet mode, an easel mode, a tent mode, and other modes are contemplated in various embodiments. Further, the convertible information handling system may also have a detachable hinge whereby a tablet head portion with display screen may be detachable from a keyboard base portion to yield an orientation mode as a detached tablet in some embodiments. Specific absorption rate (SAR) level limitations may differ between information handling systems operating as, for example, a tablet from SAR levels allowed for a laptop. Accordingly, for a convertible information handling system, the orientation mode may be identified and maximum SAR power levels adjusted dynamically according to the orientation mode detected as the convertible information handling system is changed between modes.

FIG. 1 shows an information handling system 100 capable of administering each of the specific embodiments of the present disclosure. The information handling system 100 can represent the mobile information handling systems 210, 220, and 230 or servers or systems located anywhere within network 200 of FIG. 2, including the remote data centers operating virtual machine applications. Information handling system 100 may represent a mobile information handling system associated with a user or recipient of intended wireless communication. A mobile information handling system may execute instructions via a processor for a modular dynamic wireless power control system according to embodiments disclosed herein. The application programs communicating or otherwise operating via wireless links may operate in some example embodiments as software, in whole or in part, on a mobile information handling system while other portions of the software applications may operate on remote server systems. The modular dynamic wireless power control system of the presently disclosed embodiments may operate as firmware, software, or hardwired circuitry or any combination on controllers or processors within the information handling system 100 or some of its components such as a wireless interface adapter 120. Information handling system 100 may also represent a networked server or other system and administer aspects of the modular dynamic wireless power control system via instructions executed on a processor according to various embodiments herein involving remote operation of such systems in some embodiments. The information handling system 100 may include a processor 102 such as a central processing unit (CPU), a graphics processing unit (GPU), or both. Moreover, the information handling system 100 can include a main memory 104 and a static memory 106 that can communicate with each other via a bus 108. As shown, the information handling system 100 may further include a video display unit 110, such as a liquid crystal display (LCD), an organic light emitting diode (OLED), a flat panel display, a solid state display, or other display device. Display 110 may include a touch screen display module and touch screen controller (not shown) for receiving user inputs to the information handling system 100. Touch screen display module may detect touch or proximity to a display screen by detecting capacitance changes in the display screen as understood by those of skill. Additionally, the information handling system 100 may include an input device 112, such as a keyboard, and a cursor control device, such as a mouse or touchpad or similar peripheral input device. The information handling system may include a power source such as battery 114 or an A/C power source. The information handling system 100 can also include a disk drive unit 116, and a signal generation device 118, such as a speaker or remote control. The information handling system 100 can include a network interface device such as a wireless adapter 120. The information handling system 100 can also represent a server device whose resources can be shared by multiple client devices, or it can represent an individual client device, such as a desktop personal computer, a laptop computer, a tablet computer, a 360 degree convertible device, a wearable computing device, or a mobile smart phone.

The information handling system 100 can include a set of instructions 124 that can be executed to cause the computer system to perform any one or more of the methods or computer based functions disclosed herein. For example, instructions 124 may be software applications which utilize one or more wireless links for wireless communications via the wireless interface adapter as well as other aspects or components. In an embodiment instructions 124 may be executed as the modular dynamic wireless power control system 135 disclosed herein for monitoring wireless link activity states, monitoring data transmission levels or data priority, and dynamically adjusting wireless power among simultaneously operating antenna systems. Similarly instructions 124 may be executed as the modular dynamic wireless power control system 135 disclosed herein for monitoring orientation modes, proximity mode, and wireless links and adjusting wireless power among antenna systems. In some aspects, the modular dynamic wireless power control system 135 may operate in whole or in part as firmware on a controller within the wireless interface device 120. Instructions 124 may also include aspects of the modular dynamic wireless power control system as part of a wireless adapter 120 described in the present disclosure and operating as firmware or software to remedy or adjust one or more of a plurality of antenna systems 132 via modifying output power to antenna systems 132. Further, multiple antenna systems 132 operating on various communication frequency bands may cumulatively be limited in transmission of power levels as determined for specific absorption rate (SAR) limitations under Federal Communication Commission rules and accepted safety standards in the art. Due to the nearness of transmission (and to some degree reception activity), co-located antenna systems in an information handling system 100 have effects on each other. Due to nearness of co-located antenna systems in an information handling system by virtue of physical proximity of the antenna systems, the SAR limits for transmission power are determined for the cumulative power transmitted from the co-located antenna systems and any other radiating sources.

In an aspect related to the present disclosure, the type of information handling system 100 impacts the SAR limits. For example, mobile devices such as mobile smart phones, tablets, laptops may have different SAR limits. Further, SAR limits may depend on the radio access technology being used as well as the configuration of the information handling system 100. For example, WLAN may have an acceptable SAR range of transmission between 0 dBm and 18 dBm whereas a WWAN transmission may operate between 0 dBm and 24 dBm. In some embodiments, a laptop computer may be treated as requiring limits to 1.6 watts per kilogram exposure for surfaces or areas likely to touch a person, such as along the bottom where the laptop may rest on a lap. However a laptop may also remain on a table top during periods of usage. A smart phone or tablet may be assumed to have all surfaces likely to interface with human tissue including the bottom and sides of the display screen where it may be grabbed or held. A 2-in-1 convertible laptop device may behave like a tablet in one configuration and a laptop in a different configuration in some embodiments. Nonetheless, the information handling systems 100 that transmit radiofrequency energy will be subject to safety limits when it is anticipated that the information handling systems 100 will have locations of the transmitting antennas or co-located antennas that may come in relative close physical proximity to human tissue of a user. It is understood that greater distance from a transmitting antenna yields substantially reduced exposure and absorption by human tissue.

In some aspects, instructions 124 of a modular dynamic wireless power control system 135 may execute algorithms to regulate operation of the one or more antenna systems 132 in terms of transmission power levels in the information handling system 100 to avoid exceeding overall transmission power levels from co-located antenna operation used with a convertible information handling system 100. This control occurs, in part, while the modular dynamic wireless power control system may dynamically apportion power levels between simultaneously operating antenna systems according to embodiments herein. In many current situations, SAR limits for co-located antenna systems 132 is calculated for worst-case operation where all antenna systems 132 are assumed to be operating, for example, as a tablet device with more limited power levels due to an assumption that all surfaces may contact human tissue. In one aspect of the embodiments, determination of an orientation mode trigger based on orientation indicates how a convertible information handling system 100 is being used. In some instances, the convertible information handling system 100 may be oriented such that it is being used in a tablet mode. In other instances, a different orientation mode may be operational such as a laptop mode. Increasing power to active wireless connections on active antenna systems 132 may be conducted by the modular dynamic wireless power control system 135 for orientation mode configuration that align with types of information handling systems that allow higher power transmission levels due to reduced risk of contact with human tissue. As described in embodiments herein, the modular dynamic wireless power control system 135 may dynamically alter transmission power levels based on changes detected to orientation modes of the convertible information handling system, docking status, or some combination of the same. Various embodiments of configuration modes modes, docking status as a type of orientation mode, and other triggers for use by the modular dynamic wireless power control system such as proximity detection for a proximity mode are described herein. Further, the modular dynamic wireless power control system 135 may dynamically alter transmission power levels based on changes detected to data transmission levels utilizing co-located antenna systems on the information handling system 100.

Various software modules comprising software application instructions 124 or firmware instructions may be coordinated by an operating system (OS) and via an application programming interface (API). An example operating system may include Windows®, Android®, and other OS types known in the art. Example APIs may include Win 32, Core Java API, or Android APIs. In a further example, processor 102 may conduct monitoring and processing of mobile information handling system orientation modes by the information handling system 100 according to the systems and methods disclosed herein. The computer system 100 may operate as a standalone device or may be connected such as using a network, to other computer systems or peripheral devices.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a PDA, a mobile information handling system, a tablet computer, a laptop computer, a desktop computer, a communications device, a wireless smart phone, wearable computing devices, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The disk drive unit 116 may include a computer-readable medium 122 in which one or more sets of instructions 124 such as software can be embedded. Similarly, main memory 104 and static memory 106 may also contain computer-readable medium for storage of one or more sets of instructions, parameters, or profiles 124. The disk drive unit 116 and static memory 106 also contains space for data storage. Further, the instructions 124 may embody one or more of the methods or logic as described herein. For example, instructions relating to modular dynamic wireless power control system algorithms or power control policies described in embodiments herein may be stored here or transmitted to local memory located with the wireless interface adapter 132.

In a particular embodiment, the instructions, parameters, and profiles 124 may reside completely, or at least partially, within the main memory 104, the static memory 106, and/or within the disk drive 116 during execution by the processor 102 of information handling system 100. As explained, some or all of the modular dynamic wireless power control system 135 may be executed locally or remotely. The main memory 104 and the processor 102 also may include computer-readable media. Battery 114 may include a smart battery system that tracks and provides power state data 126. This power state data may be stored with the instructions, parameters, and profiles 124 to be used with the systems and methods disclosed herein.

The network interface device shown as wireless adapter 120 can provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection. Wireless adapter 120 may include one or more radio frequency subsystems 130 with transmitter/receiver circuitry, modem circuitry, one or more unified radio frequency front end circuits, one or more wireless controller circuits, amplifiers, antenna systems 132 and other radio frequency subsystem circuitry 130 for wireless communications via multiple radio access technologies. Each radiofrequency subsystem 130 may communicate with one or more wireless technology protocols. The radiofrequency subsystem 130 may contain individual subscriber identity module (SIM) profiles for each technology service provider and their available protocols for subscriber based radio access technologies such as cellular LTE communications. The wireless adapter 120 may also include antenna systems 132 which may be tunable antenna systems for use with the system and methods disclosed herein. Additional antenna transmission power control circuitry (not shown) for controlling power to one or more antenna systems 132 may also be included with the wireless interface adapter 120 to implement power control measures to limit SAR transmission levels as described in various embodiments of the present disclosure.

In some aspects of the present disclosure, one wireless adapter 120 may operate two or more wireless links. In a further aspect, the wireless adapter 120 may operate the two or more wireless links with a single, shared communication frequency band such as with the 5G standard relating to unlicensed wireless spectrum for small cell 5G operation or for unlicensed Wi-Fi WLAN operation in an example aspect. For example, a 5 GHz wireless communication frequency band may be apportioned under the 5G standards for communication on either small cell WWAN wireless link operation or Wi-Fi WLAN operation. Multiple bands may be used across a plurality of antenna systems 132 in other embodiments. In either case, cumulative transmission power may impact whether the information handling system 100 overall is reaching SAR limits of possible exposure. In some embodiments, the shared, wireless communication band or multiple bands may be transmitted through one or a plurality of antennas 132 and via one or a plurality of wireless interface adapters 120. Other communication frequency bands are contemplated for use with the embodiments of the present disclosure as well.

In other aspects, the information handling system 100 operating as a mobile information handling system may operate a plurality of wireless adapters 120 for concurrent radio operation in one or more wireless communication bands. The plurality of wireless adapters 120 may further share a wireless communication band or operate in nearby wireless communication bands in some disclosed embodiments. Further, harmonics and other effects may impact SAR exposure levels when a plurality of wireless links are operating concurrently as in some of the presently described embodiments. The proximity of co-located antenna systems 132 precipitates a need to assess overall transmission power anticipated for the information handling system and potentially make dynamic power control adjustments to the antenna systems 132 according to the modular dynamic wireless power control system 135 of the present disclosure.

In some example embodiments, a plurality of antenna systems 132 are controlled via a plurality of wireless interface adapters 120. The interface adapters 120 may include baseband controller or other logic to execute portions of the modular dynamic wireless power control system 135 and to receive power level communication links for anticipated power levels to be used with each antenna system 132 controlled by that interface adapter 120. Plural interface adapters 120 may be connected to each other, connected to the CPU 120 and operating system or both types of connection may exist via one or more communication links via bus 108 or other communication lines. In example embodiments, a universal asynchronous receiver/transmitter (UART) or an enhanced serial peripheral interface bus (eSPI) communication link may be made between the baseband controllers or other power control of a wireless interface adapter 120 for control of one or more wireless antenna systems 132 via portions of the modular dynamic wireless power control system 135.

Assessment of the orientation mode of the information handling system 100 by the modular dynamic wireless power control system 135 may provide for adjustment of transmission power levels dynamically to comply with the regulatory SAR requirements during operation in several orientation scenarios as well as several detected variations on data transmission levels across a plurality of co-located antenna systems. The modular dynamic wireless power control system 135 may further improve the wireless experience by providing for enhanced operation of active wireless links with less tolerance for interruption or greater expected bandwidth usage from among a plurality of active antenna systems 132 while remaining within the SAR limits depending on orientation mode of the convertible information handling system 100.

The wireless adapter 120 may operate in accordance with any wireless data communication standards. To communicate, wireless standards including IEEE 802.11 WLAN standards, IEEE 802.15 WPAN standards, WWAN such as 3GPP or 3GPP2, or similar wireless standards may be used. Wireless adapter 120 may connect to any combination of macro-cellular wireless connections including 2G, 2.5G, 3G, 4G, 5G or the like from one or more service providers. Utilization of radiofrequency communication bands according to several example embodiments of the present disclosure may include bands used with the WLAN standards and WWAN carriers which may operate in both licensed and unlicensed spectrums. For example, both WLAN and WWAN may use the Unlicensed National Information Infrastructure (U-NII) band which typically operates in the ~5 MHz frequency band such as 802.11 a/h/j/n/ac (e.g., center frequencies between 5.170-5.785 GHz). It is understood that any number of available frequency bands may be used each with a plurality of channels. For example, WLAN such as WiFi may operate at a 5 GHz frequency band. WLAN may also operate at a 2.4 GHz band in other examples. WWAN may operate in a number of bands, some of which are propriety but may include a wireless communication frequency band at approximately 2.5 GHz band for example. In additional examples, WWAN carrier licensed bands may operate at frequency bands of approximately 700 MHz, 800 MHz, 1900 MHz, or 1700/2100 MHz for example as well. In the example embodiment, some licensed wireless radio frequency communication capabilities may be available via a subscriber carrier wireless service. With the licensed wireless radio frequency communication capability, WWAN RF front end may operate on a licensed WWAN wireless radio with authorization for subscriber access to a wireless service provider on a carrier licensed frequency band.

The wireless adapter 120 can represent an add-in card, wireless network interface module that is integrated with a main board of the information handling system or integrated with another wireless network interface capability, or any combination thereof. In an embodiment the wireless adapter 120 may include one or more radio frequency subsystems 130 including transmitters and wireless controllers for connecting via a multitude of wireless links. In an example embodiment, an information handling system may have an antenna system transmitter 132 for 5G small cell WWAN, Wi-Fi WLAN or WiGig connectivity and one or more additional antenna system transmitters 132 for wireless communication. The radio frequency subsystems 130 include wireless controllers to manage authentication, connectivity, communications, power levels for transmission, buffering, error correction, baseband processing, and other functions of the wireless adapter 120. Further, one or more wireless adapters 120 may be used to operate several portions of a co-located antenna systems 132 in an information handling system 100.

The radio frequency subsystems 130 of the wireless adapters may also measure various metrics relating to wireless communication pursuant to operation of the modular dynamic wireless power control system 135 as in the present disclosure. For example, the wireless controller of a radio frequency subsystem 130 may manage detecting and measuring received signal strength levels, bit error rates, signal to noise ratios, latencies, jitter, and other metrics relating to signal quality and strength. In one embodiment, a wireless controller of a wireless interface adapter 120 may manage one or more radio frequency subsystems 130. The wireless controller also manages transmission power levels which directly affect radio frequency subsystem power consumption as well as transmission power levels from the plurality of antenna systems 132. The transmission power levels from the antenna systems 132 may be relevant to specific absorption rate (SAR) safety limitations for transmitting mobile information handling systems. To control and measure power consumption via a radio frequency subsystem 130, the radio frequency subsystem 130 may control and measure current and voltage power that is directed to operate one or more antenna systems 132.

The wireless adapter 120 may also connect to the external network via a WPAN, WLAN, WWAN or similar wireless switched Ethernet connection. The wireless data communication standards set forth protocols for communications and routing via access points, as well as protocols for a variety of other operations. Other operations may include handoff of client devices moving between nodes, self-organizing of routing operations, or self-healing architectures in case of interruption.

In some embodiments, software, firmware, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions, parameters, and profiles 124 or receives and executes instructions, parameters, and profiles 124 responsive to a propagated signal; so that a device connected to a network 128 can communicate voice, video or data over the network 128. Further, the instructions 124 may be transmitted or received over the network 128 via the network interface device or wireless adapter 120.

Information handling system 100 includes one or more application programs 124, and Basic Input/Output System and firmware (BIOS/FW) code 124. BIOS/FW code 124 functions to initialize information handling system 100 on power up, to launch an operating system, and to manage input and output interactions between the operating system and the other elements of information handling system 100. The BIOS may operate to launch firmware such as wireless firmware including the modular dynamic wireless power control system 135 of various embodiments. The BIOS may execute or manage interactions with sensors for detection or orientation, docking status and other inputs to determine orientation mode or proximity mode. The BIOS may further provide that data and provide access and data from power level tables cross referencing sensor feedback to indicate a orientation mode, proximity mode, and an appropriate SAR transmission power limitation for the same. In a particular embodiment, BIOS/FW code 124 reside in memory 104, and include machine-executable code that is executed by processor 102 to perform various functions of information handling system 100. In another embodiment (not illustrated), application programs and BIOS/FW code reside in another storage medium of information handling system 100. For example, application programs and BIOS/FW code can reside in drive 116, in a ROM (not illustrated) associated with information handling system 100, in an option-ROM (not illustrated) associated with various devices of information handling system 100, in storage system 107, in a storage system (not illustrated) associated with network channel of a wireless adapter 120, in another storage medium of information handling system 100, or a combination thereof. Application programs 124 and BIOS/FW code 124 can each be implemented as single programs, or as separate programs carrying out the various features as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Figure 2:
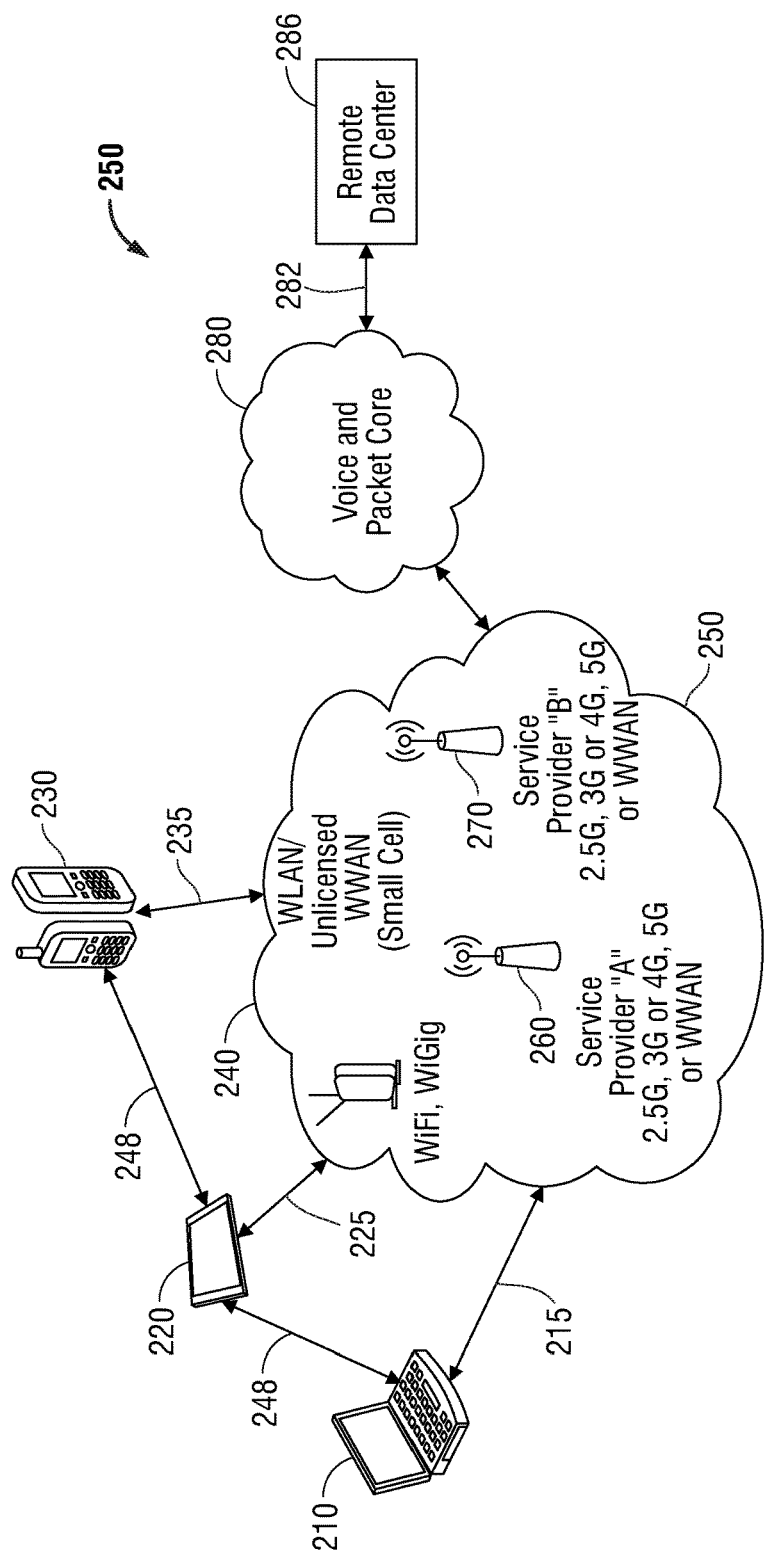
FIG. 2 is a block diagram of a network environment offering several communication protocol options and mobile information handling systems according to an embodiment of the present disclosure.

FIG. 2 illustrates a network 200 that can include one or more information handling systems. In a particular embodiment, network 200 includes networked mobile information handling systems 210, 220, and 230, wireless network access points, and multiple wireless connection link options. A variety of additional computing resources of network 200 may include client mobile information handling systems, data processing servers, network storage devices, local and wide area networks, or other resources as needed or desired. As specifically depicted, systems 210, 220, and 230 may be a laptop computer, tablet computer, 360 degree convertible systems, wearable computing devices, or a smart phone device. These mobile information handling systems 210, 220, and 230, may access a wireless local network 240, or they may access a macro-cellular network 250. For example, the wireless local network 240 may be the wireless local area network (WLAN), a wireless personal area network (WPAN), or a wireless wide area network (WWAN). In an example embodiment, LTE-LAA WWAN may operate with a small-cell WWAN wireless access point option.

Since WPAN or Wi-Fi Direct Connection 248 and WWAN networks can functionally operate similar to WLANs, they may be considered as wireless local area networks (WLANs) for purposes herein. Components of a WLAN may be connected by wireline or Ethernet connections to a wider external network. For example, wireless network access points may be connected to a wireless network controller and an Ethernet switch. Wireless communications across wireless local network 240 may be via standard protocols such as IEEE 802.11 Wi-Fi, IEEE 802.11ad WiGig, IEEE 802.15 WPAN, or emerging 5G small cell WWAN communications such as eNodeB, or similar wireless network protocols. Alternatively, other available wireless links within network 200 may include macro-cellular connections 250 via one or more service providers 260 and 270. Service provider macro-cellular connections may include 2G standards such as GSM, 2.5G standards such as GSM EDGE and GPRS, 3G standards such as W-CDMA/UMTS and CDMA 2000, 4G standards, or emerging 5G standards including WiMAX, LTE, and LTE Advanced, LTE-LAA, small cell WWAN, and the like.

Wireless local network 240 and macro-cellular network 250 may include a variety of licensed, unlicensed or shared communication frequency bands as well as a variety of wireless protocol technologies ranging from those operating in macrocells, small cells, picocells, or femtocells.

In some embodiments according to the present disclosure, a networked mobile information handling system 210, 220, or 230 may have a plurality wireless network interface systems capable of transmitting simultaneously. Example competing protocols may be wireless network access protocols such as Wi-Fi, WiGig, and WWAN in an unlicensed and licensed communication frequency bands. Access to a plurality of wireless networks 240 and 250 access points (APs) for Wi-Fi or WiGig as well as WWAN connectivity may be available in emerging 5G technology. This may create situations where a plurality of antenna systems are operating on a mobile information handling system 210, 220 or 230 via concurrent active wireless links on both WLAN and WWAN and which may operate within the same, adjacent, or otherwise co-located antenna systems. Such issues may be addressed or mitigated with remedies according to the modular dynamic wireless power control system according to embodiments herein.

The voice and packet core network 280 may contain externally accessible computing resources and connect to a remote data center 286. The voice and packet core network 280 may contain multiple intermediate web servers or other locations with accessible data (not shown). The voice and packet core network 280 may also connect to other wireless networks similar to 240 or 250 and additional mobile information handling systems such as 210, 220, 230 or similar connected to those additional wireless networks. Connection 282 between the wireless network 240 and remote data center 286 or connection to other additional wireless networks may be via Ethernet or another similar connection to the world-wide-web, a WAN, a LAN, another WLAN, or other network structure. Such a connection 282 may be made via a WLAN access point/Ethernet switch to the external network and be a backhaul connection. The access point may be connected to one or more wireless access points in the WLAN before connecting directly to a mobile information handling system or may connect directly to one or more mobile information handling systems 210, 220, and 230. Alternatively, mobile information handling systems 210, 220, and 230 may connect to the external network via base station locations at service providers such as 260 and 270. These service provider locations may be network connected via backhaul connectivity through the voice and packet core network 280.

Remote data centers may include web servers or resources within a cloud environment that operate via the voice and packet core 280 or other wider internet connectivity. For example, remote data centers can include additional information handling systems, data processing servers, network storage devices, local and wide area networks, or other resources as needed or desired. Having such remote capabilities may permit fewer resources to be maintained at the mobile information handling systems 210, 220, and 230 allowing streamlining and efficiency within those devices. Similarly, remote data center permits fewer resources to be maintained in other parts of network 200.

In an example embodiment, the cloud or remote data center or networked server may run hosted applications for systems 210, 220, and 230. For example, remote data center, networked server, or some combination of both may operate some or all of a modular dynamic wireless power control system in embodiments of the present disclosure including storing and providing power tables for SAR transmission power limits specific to orientation modes for particular models of information handling system 100 or updates of the same as disclosed in the present disclosure. The cloud or remote data center or networked server may run hosted applications for systems 210, 220, and 230 by establishing a virtual machine application executing software to manage applications hosted at the remote data center in an example embodiment. Mobile information handling systems 210, 220, and 230 are adapted to run one or more applications locally, and to have hosted applications run in association with the local applications at remote data center or networked servers. For example, mobile information handling systems 210, 220, and 230 may operate some or all of the modular dynamic wireless power control system or software applications utilizing the wireless links, including a concurrent wireless links, in some embodiments. The virtual machine application may serve one or more applications to each of mobile information handling system 210, 220, and 230. Thus, as illustrated, systems 210, 220, and 230 may be running applications locally while requesting data objects related to those applications from the remote data center via wireless network. In another example, an electronic mail client application may run locally at system 210. The electronic mail client application may be associated with a host application that represents an electronic mail server. In another example, a data storage client application such as Microsoft Sharepoint may run on system 220. It may be associated with a host application running at a remote data center that represents a Sharepoint data storage server. In a further example, a web browser application may be operating at system 230. The web browser application may request web data from a host application that represents a hosted website and associated applications running at a remote data center.

Although 215, 225, and 235 are shown connecting wireless adapters of mobile information handling systems 210, 220, and 230 to wireless networks 240 or 250, wireless communication may link through a wireless access point (Wi-Fi or WiGig), through WWAN small cell base stations such as in network 240 or though a service provider tower such as that shown with service provider A 260 or service provider B 270 and in network 250. In other aspects, mobile information handling systems 210, 220, and 230 may communicate intra-device via 248 when one or more of the mobile information handling systems 210, 220, and 230 are set to act as a access point or even potentially an WWAN connection via small cell communication on licensed or unlicensed WWAN connections. For example, one of mobile information handling systems 210, 220, and 230 may serve as a Wi-Fi hotspot in an embodiment. Concurrent wireless links to information handling systems 210, 220, and 230 may be connected via any access points including other mobile information handling systems as illustrated in FIG. 2.

Figure 3:
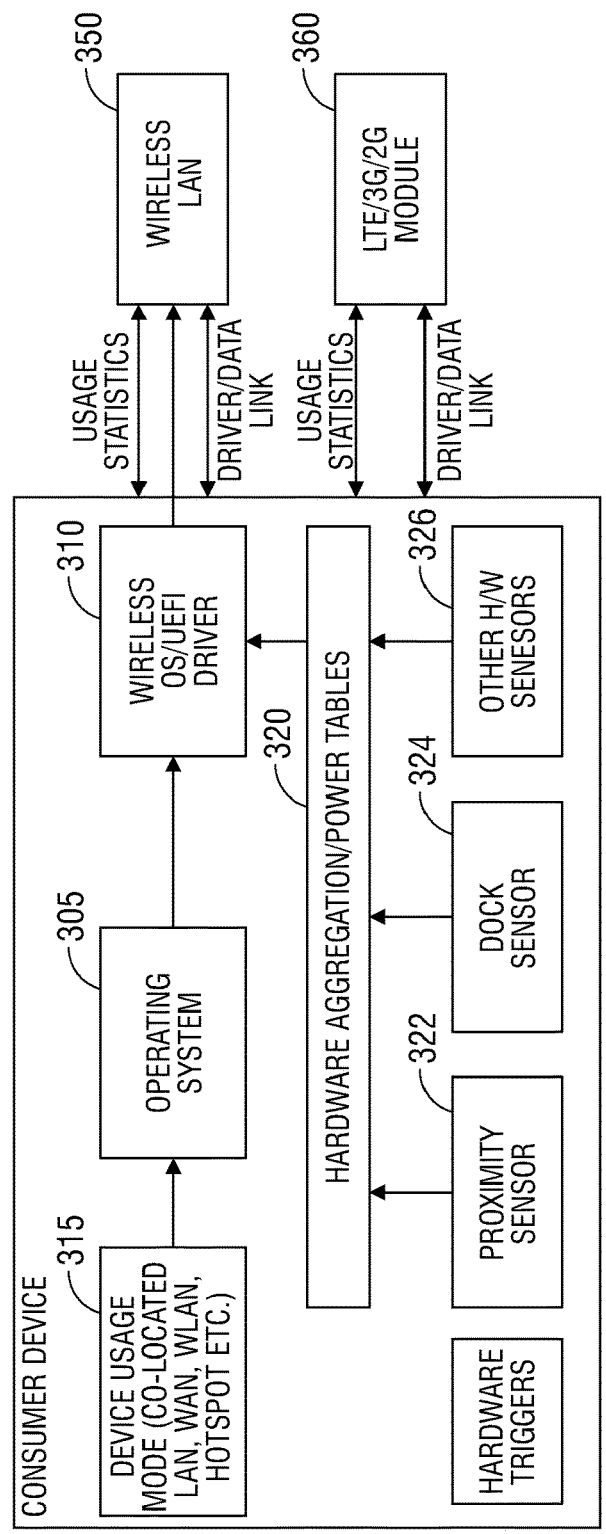
FIG. 3 block diagram illustrating a modular dynamic wireless power control system according to an embodiment of the present disclosure.

FIG. 3 illustrates a modular dynamic wireless power control system operating via one or more antenna systems 350 and 360 and assessing device simultaneous transmit configuration modes 315. For example, the modular dynamic wireless power control system may assess type of wireless operation WLAN, WWAN, hotspot operation, or other wireless activity that may indicate active antenna systems such as 350 and 360. The instructions of the modular dynamic wireless power control system may operate in parts on an operating system 305 via BIOS and operating system connection to the wireless antenna systems 350 and 360 and corresponding wireless interface adapters. Wireless drivers 310 may operate through operating system wireless drivers using runtime dynamic control as well as through BIOS or other aspects using wireless UEFI control connections. The power usage levels of various active antenna systems may be managed through the advanced configuration and power interface (ACPI) or an application programming interface of the operating systems such as Windows 10. Wireless antenna system 350 may include wireless LAN antennas and other components and may include multiple antenna systems supporting one or more WLAN protocols. For example, wireless LAN antenna system 350 may support WiFi at one or more various operating frequencies or similar WLAN protocols. Wireless antenna system 360 may include multiple wireless WAN antennas and other components supporting one or more WWAN protocols. For example, wireless WAN antenna system 360 may support multiple cellular protocols at one or more various operating frequencies or similar WWAN protocols including 3GPP LTE, 5G, 4G, 3G, 2G, or the like which may be carrier based protocols or small cell protocol operation.

Portions of the modular dynamic wireless power control system may operate via the ACPI in BIOS ASL including detecting and aggregating sensor data for determination of orientation modes, proximity detection, and accessing power tables for various types of orientation modes or proximity modes at 320. Several hardware sensor triggers may be assessed for control over power transmission levels due to orientation mode or detected proximity mode. For example, proximity sensors may be used with the modular dynamic wireless power control system to determine if a user is detected near the information handling system or, more particularly, near the location of one or more antenna systems such as 350 or 360 in some embodiments. Dock sensors 324 may determine if the information handling system is docked as to the tablet head portion of a convertible information handling system connected to a keyboard base. In an example embodiment, an I2C handshake between a tablet head embedded controller and a keyboard base embedded controller may indicated the status of docking between the two portions of a detachable convertible information handling system in some example embodiments. An indication of the docking status indicating an unconnected tablet head from the keyboard base may indicate a tablet mode of operation in some example embodiments. In other embodiments, the docking sensor 324 may detect attachment of a convertible information handling system to a docking station via a similar I2C handshake connection or other detection system indicating a connection between the information handling system and the docking station. Docking at a docking station may indicate that the information handling system is being used on a desktop and risk of human contact is reduced in some embodiments.

Orientation sensors and other sensors 326 may be detected for determination of any of several orientation modes as described in embodiments herein. A sensor hub or other hardware aggregation may be used to monitor and receive sensor data that serves as all or part of some of the data received to determine orientation modes or proximity modes described for orientation, docking status, user proximity, and the like. For example, an operating system operating on a CPU chipset or the like may communicate with wireless interface adapter having a WWAN module or a WLAN module for connecting to the WWAN antenna system 360 or the WLAN antenna system 350 via wireless OS or UEFI driver communication from 310. The wireless drivers 310 may also be in communication in an embodiment with the hardware aggregator as well as power tables in an embodiment. In another embodiment, the OS operating some portion of the modular dynamic wireless power control system may communicate via ACPI communication with the sensor hardware data aggregator such as 320.

In an example embodiment, the hardware aggregator 320 may be an accumulator sensor hub. The accumulator sensor hub gathers sets of data from some or all of a variety of orientation sensors and other hardware sensors 326, proximity sensors 322, docking sensors 324 or the like as shown for use with the orientation modes or proximity modes. Sensor hub may be located within wireless interface adapter or elsewhere on motherboard of the information handling system. Orientation sensor types 326 may include motion sensors and other sensors. Some or all of the orientation sensors 326 may be connected through the sensor hub or accumulator device and system. Orientation sensors 326 may include one or more digital gyroscopes, accelerometers, and magnetometers. Orientation sensors 326 may also include reference point sensors. For example, a geomagnetic field sensor may determine position of a display screen relative to a keyboard of a laptop or a 360 degree convertible device. This positional information may provide x-axis, y-axis, and z-axis positional information of the information handling system relative to magnetic north pole, and there for a reference point of the device position. In one embodiment, two geomagnetic field sensors provide x-axis, y-axis, and z-axis positional information for the display screen relative to the keyboard base of a convertible information handling system. With this data, the system determines the relative position of the display screen or tablet head portion of the convertible information handling system to the keyboard base portion in orientation.

Also, a digital gyro and accelerometer may be used to detect motion and changes in position. These sensors 326 may provide a matrix of data. In an example embodiment, the azimuth or yaw, pitch, and roll values of the device are indicated by the raw sensor data. The orientation data may be relevant to relative locations of antennas with an information handling system such as those located in different hinged portions in one embodiment. In connection with a reference point, such magnetic north as provided in one embodiment by a geomagnetic field sensor, the azimuth can be determined as a degree of rotation around a z-axis. Further hinge azimuth angle may be discussed further below. In an embodiment, the azimuth may be the value of the z-axis relative to the device y-axis as positive angle values between 0° and 360° for a 360 degree convertible information handling system. It is understood that a different range of values may be assigned in different embodiments of a laptop mode, a tablet mode, an easel mode, a tent mode, or even modes assigned in part based on docking status.

Based on a reference point such as provided by a geomagnetic field sensor 326, pitch may be determined as a degree of rotation around the x axis. In an example embodiment, the angle values may range from positive 180° to negative 180° relative to the y-axis, although other value ranges may be assigned instead. Roll is also based on the reference value, for example that established by a geomagnetic sensor. Roll may be considered to be rotation about the y-axis and its values may range from positive 90° to negative 90°. Again, the value ranges assigned can vary for each of the azimuth, pitch, and roll as long as a set of values is used to define orientation parameters in three dimensional space.

The orientation sensor data may be processed partly by the hardware aggregation 320 to provide orientation data for the information handling system. The sensor hub performs a fusion of data signals received from either a single sensor or multiple sensor devices. In one example embodiment, the hardware aggregator 320 may be a sensor hub that is an independent microcontroller such as the STMicro Sensor Fusion MCU.

The sensor data may further include proximity sensors 322 or capacitive touch sensors. For example, proximity sensors 322 such as capacitive sensors may detect the location of a user relative to various parts of the information handling system and antennas located nearby. Proximity sensor 322 may also be infrared sensors or other known proximity sensors 322 including utilization of a touchscreen or camera systems to detect proximity of a user as understood in the art. Proximity sensors 322 on a display screen or a keyboard may detect the position of a user body part (such as a hand, lap, arm, torso or the like) around information handling system (for example, directly in front, above, below, to the right, or to the left of the plane of the display screen or the keyboard) and thus determine required SAR levels based on the position of the user or users. Further, orientation may indicate a current orientation mode setting levels of maximum transmission power for a configuration of a convertible information handling system.

Another sensor state of orientation activity sensor 326 is a Hall Effect sensor that may detect when a magnet, of certain polarity and strength, is in proximity to the sensor. It is used to detect the closed position of a device with two sides such as a display portion and a keyboard base portion of a convertible information handling system. For example, a Hall Effect sensor may determine when two hinged portions including a tablet or screen head portion and keyboard base portion are closed onto one another so that a magnet in the tablet head portion triggers a Hall Effect sensor in the keyboard base portion. Alternatively, a different Hall Effect sensor may determine if the hinged display screens are open to an orientation of 360° so that the back sides of the tablet or screen head portion is in proximity with keyboard base portion such that a magnet located with one display screen triggers the Hall Effect sensor of the other.

Hall Effect magnets and magnetic sensors may be deployed as a type of orientation or state sensor 326 for orientation mode determinations. It is known in the art that a relative angle between a magnetic field source of known polarity and strength may be determined by strength and change to a magnetization vector detected by magnetoresistive detectors of a Hall Effect sensor. Thus, motion and relative angle may also be detected by the Hall Effect sensors. As described, the Hall Effect sensor may also detect when a laptop of 360 degree convertible computer, also referred to as a 2 in 1 device is fully open or closed.

Other detectors are also contemplated include a docking station connection detector 324 to detect when a mobile information handling system has been docked and is likely used in a desktop format. Additional other detectors 326 may include a hinge angle detector that may be mechanical, electromechanical or another detecting method to determine how far the hinge between the a display screen and a keyboard base has been opened.

Orientation of antennas relative to one another as well as relative location to a user may impact interference issues or impact the SAR safety requirements limiting transmission power levels. Further, SAR safety limitations may also be changed depending on whether a device is operating as a tablet computer, a laptop computer, or may switch between the two configurations such as a with a 360 degree convertible device. Moreover SAR safety limitations may be relaxed when an information handling system is docked in that it is then normally operating on a desktop and not likely in proximity with a user. The orientation mode or proximity mode sensors 322, 324 and 326, such as those described, may be connected to hardware data aggregator 320 and further to a wireless interface adapter or processor such as a CPU chipset or BIOS controller operating the modular dynamic wireless power control system of the embodiments of the present disclosure. The orientation mode or proximity mode sensors 322, 324 and 326 in some embodiments may be used to determine configuration of orientation or proximity detection of the information handling system and may be further cross referenced with a power table for determination of power levels necessary to be implemented for antenna transmission power limitations due to SAR requirements based on the orientation mode or proximity mode determined by the modular dynamic wireless power control system. Data from the above sensors 322, 324, and 326 may be provided to sensor hub for use by the modular dynamic wireless power control system to dynamically control power levels depending on one or a combination of orientation, docking status, proximity or other factors.

The wireless interface adapter or the modular dynamic wireless power control system operating via one or more parts of the information handling system may determine, from power tables or the like, one or more appropriate antenna power modifications, if any, based on the power tables reflecting a stored power control adjustment policy. The antenna power control adjustment policy is accessed by executing code instructions for the modular dynamic wireless power control system operating on the any portion of the wireless adapter or in the OS. The antenna power control adjustment policy may establish for the modular dynamic wireless power control system a plurality of antenna element power control parameters for coexistence controls when multiple antennas are operating and cumulative transmission power is assessed for SAR safety requirements. With the coexistence controls, the power control may adjust power to one or more antenna systems.

Figure 4:
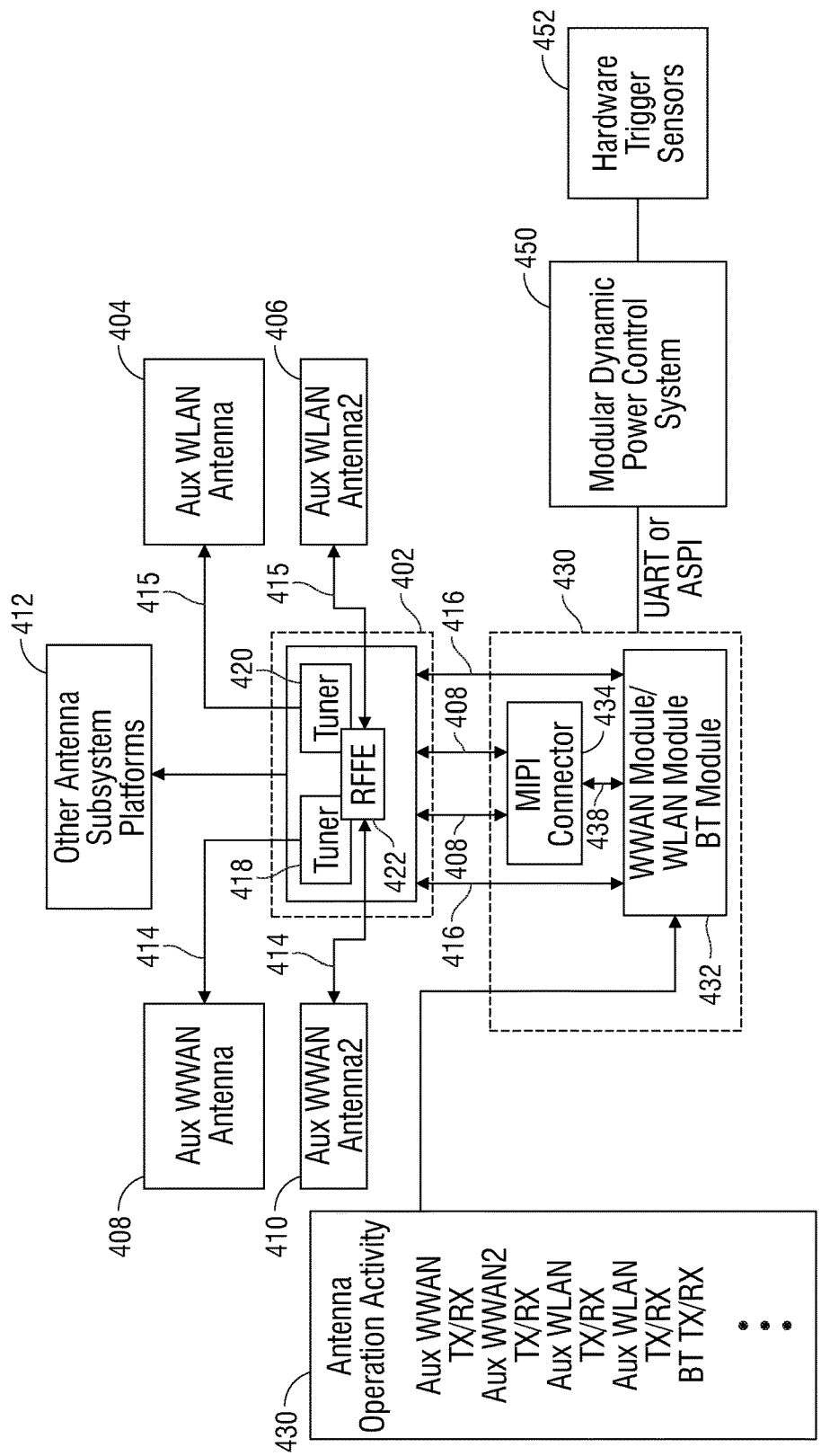
FIG. 4 is a block diagram illustrating a modular dynamic wireless power control system and wireless interface according to an embodiment of the present disclosure.

FIG. 4 illustrates a modular dynamic wireless power control system 450 operating via an RF front end 402 and a wireless interface adapter 430 for one or more antenna systems 404, 406, 408, 410 and 412 that may operate on an information handling system in an example embodiment. In an example aspect, the RF front end 402 may operate a plurality of tuners and power controller for the plurality of antenna systems 404, 406, 408, 410, and 412. In other embodiments, the RF front end 402 may be a unified front end which accommodates a plurality or all of the operational antenna systems 404, 406, 408, 410, and 412 of the information handling system. The RF front end 402 in other embodiments may include a plurality of RF front end systems for the types of antenna systems 404, 406, 408, 410, and 412 available at an information handling system. In embodiments, the RF front end 402, which may be either a unified or plural front end systems, may accommodate operation of the modular dynamic wireless power control system 450 and may operate with a wireless interface adapter 430 for determination of active wireless systems 440. Determination of active wireless systems 440 by the modular dynamic wireless power control system 450 will provide for determination of dynamic power control over antenna systems 404, 406, 408, 410, and 412 based on relative data transmission levels between active antenna systems according to embodiments of the present disclosure. Determination of active wireless links 440 and determination of relative data transmission levels act as trigger factors in determining relative power allotment for the active antenna systems amongst antenna systems 404, 406, 408, 410, and 412. Coordination of power levels for antenna systems 404, 406, 408, 410, and 412 may be via a wireless interface device 430 and a unified front end 402 or may be conducted by a processor or the wireless interface device 430 in connection with a plurality of RF front end systems for control of antenna systems 404, 406, 408, 410, and 412.

In yet another aspect, RF front end, such as the unified RF front end shown at 402, may also concurrently operate multiple antenna systems within the same RAT such as plural cellular connections or with MIMO or other aggregated connectivity through the plural antennas on the information handling system. Concurrent antenna operation may be across a variety of available RATs and may further accommodate aggregation of multiple parallel data streams across RATs in some embodiments as such technology becomes more available. In an example embodiment, an information handling system wireless interface adapter 430 may operate a plurality of WiFi antenna systems with MIMO to expand available bandwidth for wireless data transfer via WiFi. Similarly, in other embodiments, a plurality of LTE or other WWAN wireless links may be operated with MIMO to expand bandwidth for wireless data transfer via LTE. In some additional embodiments, plural data streams may be aggregated between WWAN and WLAN.

As described herein, modular dynamic wireless power control system 450 may receive a plurality of inputs and access a dynamic power control adjustment policy stored for antenna element power control parameters to execute modifications to the power levels amongst the antenna systems 404, 406, 408, 410 and 412. The modular dynamic power control policy may be particular to a model type of an information handling system in an aspect. One or more of several antenna simultaneous transmit configuration modes are available to the RF front end 402 in some embodiments. The modular dynamic wireless power control system 450 may implicate the detected antenna simultaneous transmit configuration modes to accommodate the dynamic power control adjustment policy based on received trigger inputs such as detected active wireless links, data transmission levels on the active wireless links, and determination of relative activity levels between transmission and reception for the plurality of antenna systems 404, 406, 408, 410 and 412 among other trigger inputs as described in various embodiments herein. Further, the orientation mode may be assessed to determine maximum SAR power levels permitted among the active wireless links. Hardware trigger sensors 452 may provide indications of orientation to determine what maximum SAR power level applies to the current orientation of an information handling system, for example a convertible laptop information handling system. Further, proximity sensors may be part of hardware trigger sensors 452 and indicate a user proximity to the information handling system. This too may affect the transmission power levels for one or more of the simultaneously transmitting wireless links as described in embodiments herein.

The RF front end 402 may include a RF front end controller 422 that may include access to a local memory for a unified device or for a plurality of RF front ends 402 (not shown). The RF front end controller 422 may also interface with one or more tuners 418 and 420. The RF front end module 402 may interface with a plurality of antenna systems 404, 406, 408, 410, and 412 directly or via a tuner system and may further control power levels supplied to each of the one or a plurality of antenna systems 404, 406, 408, 410, and 412 it controls. In FIG. 4, a plurality of WWAN antenna systems are shown such as for cellular connectivity to wireless links. It is understood that some portions of antenna systems 404, 406, 408, 410, and 412 in the presently shown example embodiment may be differing services available through WWAN including small cell licensed WWAN connections or subscriber cellular connectivity such as through LTE, WCDMA, or other WWAN protocols. Further, it is understood that other antenna systems 404, 406, 408, 410, and 412 are shown as a plurality of WLAN antennas such as WiFi antennas, the RF front end 402 may also be used to interface with a plurality of additional antennas, for example WLAN or WPAN antennas such as Bluetooth® systems. Also, a plurality of LTE and Wi-Fi antennas may be mounted and operational on the information handling system model in which a unified RF front end 402 or a plurality of RF front ends 402 are installed.

In some aspects, a plurality of RF front end systems or a unified RF front end 402 may interface and control a plurality of antennas across several RAT types including cellular, Wi-Fi, and Bluetooth to name a few as well as a wireless interface adapter system 430. A CPU, a wireless interface adapter 430, or RF front end 402 and controller 422 thereon may execute machine readable code instructions of modular dynamic wireless power control system 450 for dynamic power control of the plurality of antennas associated with a wireless interface device 430 or connected in coordination of the same according to embodiments of the present disclosure. For example, RF front end 402 or wireless interface adapter 430 may interface with other wireless interface adapters or other RF front ends and their wireless antenna subsystem platforms. Coordination with those other antenna subsystem platforms may be to varying degrees but may be coordinated with the dynamic antenna power adjustments in response to determination of data transmission levels or priority levels for active, co-located antenna systems.

Antenna systems 404, 406, 408, 410 and 412 may be connected to RF front end 402 via connections 414 which may include antenna connection ports in some embodiments. Antenna systems 404, 406, 408, 410 and 412 may be a variety of antenna systems that are mounted within the information handling system or may utilize peripheral antenna systems connected to RF front end 402. In some example embodiments, antenna systems 404, 406, 408, 410 and 412 may utilize an antenna device installed on an information handling system. In other embodiments, antenna systems 404, 406, 408, 410 and 412 may also incorporate RF radiator surfaces such as portions of the information handling system chassis, motherboard, wiring/traces, or case components as aspects of the antenna systems 404, 406, 408, 410 and 412. Some of these RF radiation effects may not be intentional but may affect cumulative SAR exposure levels for various information handling systems. In yet other example embodiments, antenna systems 404, 406, 408, 410 and 412 may utilize auxiliary devices such as cords or cabling external to the information handling system which may additionally affect SAR exposure levels during co-located operation.

RF front end 402 may be connected to a plurality of system motherboard components of a wireless interface device for a mobile information handling system. For example, I2C lines such as 416 may be connected between an RF front end 402 and a WWAN module or other protocol module such as WLAN or Bluetooth modules for control via the protocol. In a further aspect, a Mobile Industry Processor Interface (MIPI) connector 434 may be connected via one or more MIPI lines 408 to RF front end 402 in an embodiment. The MIPI connector 434 may in turn be connected to a protocol module 432 via 438 and may be used to forward instructions, policy details, or other data or commands to the RF front end 402 according to embodiments of the present disclosure. It is understood that the I2C lines or MIPI lines may be used for various aspects of the embodiments disclosed herein including for transfer of data, activity detection, data transmission levels, policy, or commands from the protocol module 432, the modular dynamic wireless power control system 450, or subsystems of the wireless interface device adapter to the RF front end 402.

Additional sensor based power controls may be implemented according to some embodiments along with those of the modular dynamic wireless power control system 450 of the embodiments of the present disclosure. Hardware trigger sensors 452 may provide additional inputs which may be utilized by the modular dynamic wireless power control system 450 according to embodiments of the present disclosure. In one example embodiment, a detected orientation may set the permissible maximum SAR power levels for cumulative instantaneous transmission power levels for a plurality of antenna systems according to embodiments herein. In another example embodiment, power driving for transmission may be shifted as between concurrently operating antenna systems by the unified RF front end depending on a trigger input arising indicating a need to reduce or increase power to any antenna system. In an embodiment, a shift of power between antenna system may occur if a user body part is detected proximate to one or more antenna systems, those systems may have transmission power reduced. Other power reduction activity may be implemented along with the dynamic power controls of the modular dynamic wireless power control system 450 of the present embodiments.

Figure 5:
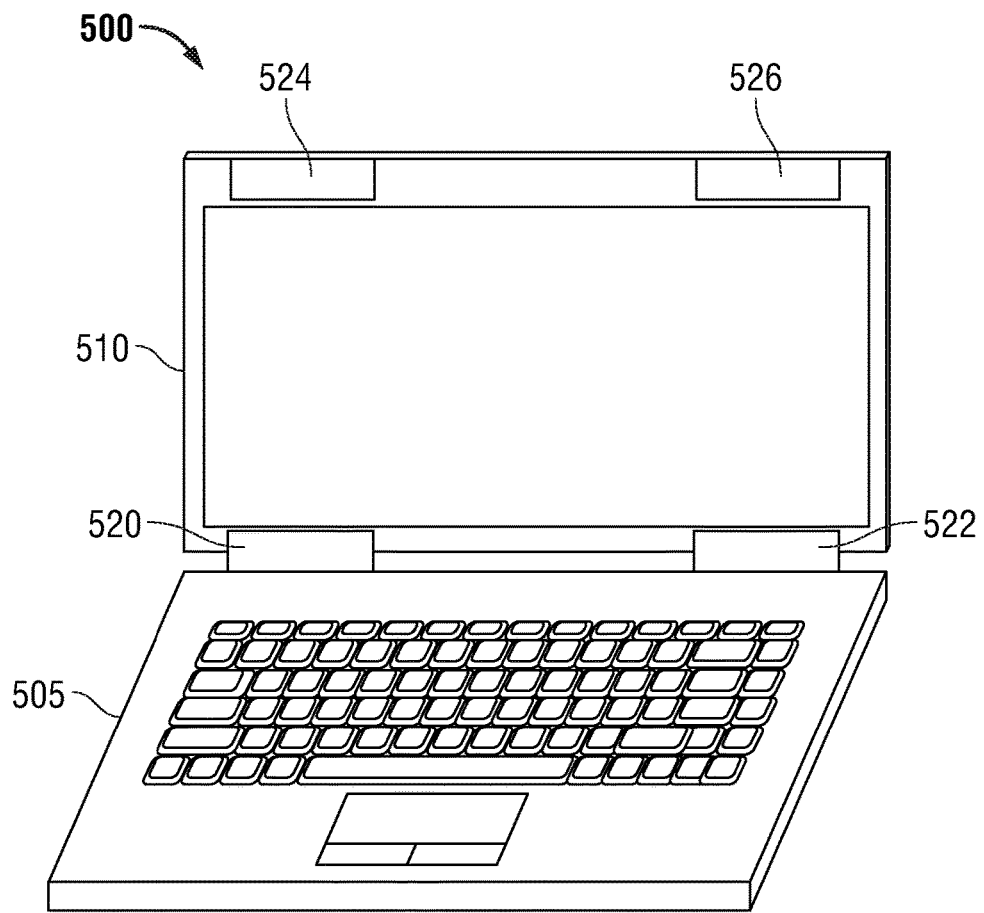
FIG. 5 is a graphic diagram illustrating a mobile information handling system with a plurality of co-located antenna systems according to an embodiment of the present disclosure.

FIG. 5 shows an information handling system 500 with multiple co-located antenna systems according to an embodiment of the present disclosure. In this example embodiment, information handling system 500 shows an example embodiment of a convertible laptop, however many other information handling system types are contemplated for use with the modular dynamic wireless power control system of the embodiments herein. For example, a laptop computer system, tablet computing systems, mobile smart phone devices, wearable computing devices and other information handling systems may have a plurality of co-located antenna systems and be subject to orientation changes according to various embodiments. It is understood that the modular dynamic wireless power control system of the embodiments herein may be applied Information handling system 500 includes a display screen portion 510 and a keyboard base 505 and may operate in accordance with one or more embodiments above including some of those of FIG. 1. Information handling system 500 is shown with a plurality of antenna systems 520, 522, 524, and 526 mounted around various locations on the information handling system 500. In the example embodiment, antennas 500 and 522 are WLAN antenna systems such as those for 2.4 GHz and 5 GHz WiFi in an example embodiment. Antennas 524 and 526 are WWAN antennas in the example embodiment such as two (or more) LTE antenna systems operating in one or more bands. It is understood that additional antenna systems for WWAN, WLAN, or other protocols such as WiGig and Bluetooth may be implemented as well although not shown in FIG. 5. The antenna systems 520, 522, 524, and 526 are shown located at positions around display portion 510. This is one example arrangement of co-located antenna systems, however antenna systems 520, 522, 524, and 526 may be mounted in any location of the display portion 510 or the keyboard base 505. The antenna systems 520, 522, 524, and 526 may further utilize surfaces such as the back or edges of display portion 510 or portions of the keyboard base as radiating surfaces to work with those antenna systems.

Figure 6A:
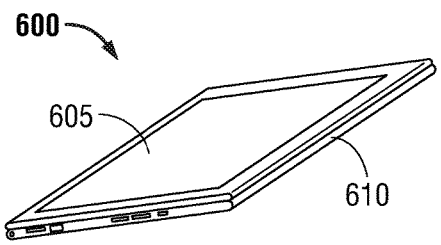
FIGS. 6A, 6B, 6C, and 6D are graphic diagrams illustrating a orientation modes of a convertible information handling system according to an embodiment of the present disclosure.

FIG. 6A shows an example of a convertible information handling system 600 with a hinged display screen or tablet head 605 hinged to a keyboard base portion 610. FIG. 6A illustrates a tablet orientation which may represent a tablet orientation mode for the convertible information handling system embodiment of the present disclosure. In the embodiments of FIG. 6A, the display screen portion 605 and the keyboard base portion 610 are connected via hinge along one side where the hinge is fully open so that the back sides of the display screen 605 and the keyboard base 610 are in contact or nearly in contact. In this tablet orientation mode, the display screen 605 is viewable and keyboard base 610 is folded behind. In these tablet mode orientation embodiments, the relative hinge angle of the hinge is approximately 360°. A range of tablet orientation mode hinge angles is contemplated so long as one display screen is the primary viewed display screen. In tablet mode, a user may interface with all sides and surfaces of the convertible information handling system. In tablet mode, the convertible information handling system 600 may be subject to more stringent or lower restrictive transmission power level maximums due to the risk of enhanced contact with human tissue during use. In one example embodiment, it is contemplated that tablet mode orientation have a relative hinge angle of between approximately 340° and approximately 360°. Any range of degrees around 360° may be used in various embodiments.

In other embodiments, the information handling system 600 may be a hinged dual tablet information handling system or a single screen, dual display screen housing information handling system. In such an embodiment, the two screens or a single bendable screen mounted on two hinged display housings may be used with an information handling system embodiment. The tablet orientation shown in FIG. 6A would similarly apply to a hinged dual display housing system where the hinge was open between approximately 340° and approximately 360°. In the case of the hinged dual tablet information handling system or a single screen, dual display screen housing information handling system, another tablet orientation mode is possible at around 180° such that the display screen or display screen are opened flat in a double tablet mode. In an example embodiment, a double tablet mode may occur between approximately 170° and 190° in one example embodiment. Any range of degrees +/−180° may be used in various embodiments.

Various sensor components in the convertible information handling system embodiment 600 or a dual display housing system may be mounted on either side according to the disclosures. One or both of the tablet head and keyboard based or either or both display screen housings may contain one or more accelerometers, geomagnetic sensors, cameras, digital gyroscopes or other sensors described herein. Additional state sensors may also be present including a photocell ambient light sensor, a Hall Effect magnet and sensor, camera, touch/hover sensors, and other sensors as described above.

There is no requirement that all sensor types be present. For example, a sensor module may only need a motion detector and a reference sensor as described above for the display screen and another sensor in the keyboard base portion. For example, either an accelerometer or a gyroscope and a reference sensor such as a geomagnetic sensor may be associated with one portion of the hinged convertible information handling system while the other portion has a sensor to detect changes or differences between the two portions such as a tablet head and keyboard base or two display screen housings. The second portion may use a second geomagnetic sensor or one motion sensor. Even the Hall Effect sensor or a Doppler shift sensor in a second portion such as either a tablet head or keyboard base may be used to indicate changes in position relative to a first portion as described above. The more sensor data available in each side of the convertible information handling system, the better accuracy of the orientation data and less computing required to determine the orientation. The downside however is added the expense, space, and power resources that many sensors will occupy in the dual display information handling system.

Figure 6B:
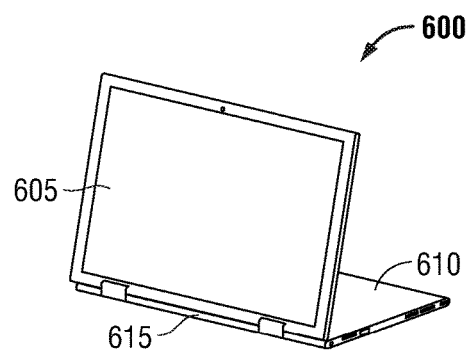

FIG. 6B shows an easel mode orientation for the convertible information handling system in an embodiment of the present disclosure. In the embodiment of FIG. 6B, a display screen or tablet head portion 605 and a keyboard base portion 610 are connected via a hinge 615 having a hinge azimuth orientation at approximately 90° or a hinge line perpendicular to the sight line of a viewer. The hinge 615 is operable so that the convertible information handling system may be arranged in an open position at approximately 305° relative angle between the display screen 605 and the keyboard base 610 and where the front of the display screen 605 is viewable and the keyboard base is face-down. However, a range of relative hinge angles between the display screen 605 and the keyboard base 610 is contemplated in easel mode orientation. In one example embodiment, it is contemplated that easel orientation mode have a relative hinge angle of between approximately 250° and approximately 340°. Any range of degrees +/−305° may be used in various embodiments. Note that this may overlap somewhat with one embodiment of a tent orientation mode described below. However, in easel orientation mode, the display screen is generally facing forward and the keyboard base is facing in a downward orientation. Note that the relative hinge angle of easel orientation mode may overlap with other embodiments, such as one embodiment of tent orientation mode or even single or dual tablet orientation mode. However, other orientation aspects may differentiate the orientation modes such as orientation of each portion of the information handling system relative to another portion with respect to orientation of various edges of each portion relative to an up or down position or other angular position.

Easel orientation mode is similarly contemplated for a hinged dual tablet information handling system or a single screen, dual display screen housing information handling system where one display screen housing may replace the keyboard base in the determination of the orientation for the orientation mode.

Figure 6C:
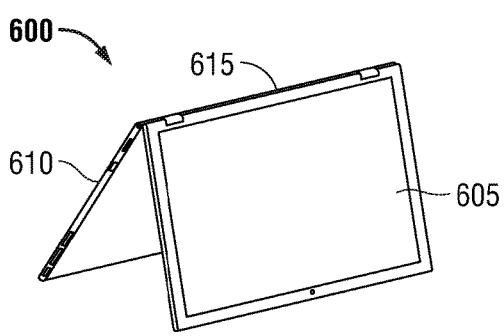

FIG. 6C shows a tent orientation mode for the convertible information handling system according to an embodiment of the present disclosure. Tent orientation mode may be contemplated as well for a hinged dual tablet information handling system or a single screen, dual display screen housing information handling system in some embodiments. In the embodiment of FIG. 6C, a display screen 605 and a keyboard base 610 or a second display screen housing (not shown) are connected via a hinge 615 having a hinge azimuth orientation at approximately 90° or a hinge line perpendicular to the sight line of a viewer. The hinge 615 is operable so that the convertible information handling system or dual display screen housing information handling system may be arranged in an open position at approximately 305° relative angle between the display screen and keyboard base or two display screen housings and where the front of a display screen is viewable on one side while the keyboard base or other display screen is on the other side. In an example embodiment, a range of relative hinge angles between approximately 180° and 350° between the display screen and keyboard or two display screen housings is contemplated for tent orientation mode. Any range +/−305° may be used in various embodiments. In one additional example embodiment, it is contemplated that tent orientation mode have a relative hinge angle of between approximately 200° and approximately 340°. Note that the relative hinge angle of tent orientation mode may overlap with other embodiments, such as one embodiment of easel orientation mode or even single or dual tablet orientation mode. However, other orientation aspects may differentiate the orientation modes such as orientation of each portion of the information handling system relative to another portion with respect to orientation of various edges of each portion relative to an up or down position or other angular position.

Figure 6D:
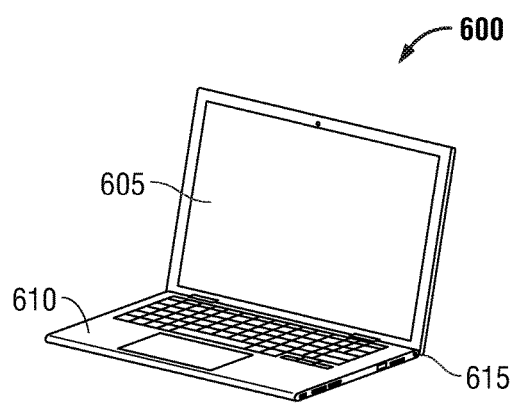

FIG. 6D illustrates a laptop orientation mode of the convertible information handling system 600 in an embodiment of the present disclosure. The laptop orientation mode may also be applied in example embodiments to a hinged dual tablet information handling system or a single screen, dual display screen housing information handling system where one display screen housing may replace the keyboard base in the determination of the orientation mode. In the embodiment of FIG. 6D, display screen 605 and keyboard base 610 or a second display screen housing (not shown) are connected via a hinge 615 having a hinge azimuth orientation at 0° or perpendicular to the sight line of a viewer. The hinge is operable so that the dual display information handling system may be arranged in an open position at approximately 100° relative angle between the display screen and the keyboard base or the two display screen housings and where the front of the keyboard and display screen or both display screen housings are viewable. A range relative hinge angles is contemplated, so long as the keyboard base 610 or lower display base screen is usable for an input device such as a keyboard or virtual keyboard. In one example embodiment, it is contemplated that laptop orientation have a relative hinge angle of between approximately 90° and approximately 120°. Any range around +/−100° is contemplated in various embodiments. Note that the relative hinge angle of laptop orientation mode may overlap with other embodiments. However, other orientation aspects may differentiate the orientation modes such as orientation of each portion of the information handling system relative to another portion with respect to orientation of various edges of each portion relative to an up or down position or other angular position.

Each orientation for determining an orientation mode is not necessarily separate from other orientation modes in available ranges of relative angle or hinge azimuth orientation of the hinge. Moreover, all angles including hinge azimuth angles relative to a viewer's line of sight are approximate and may vary substantially. For example, in hinge azimuth angles a variance may be up to +/−30°. This is due, for example, to variation of a viewer's position while using the dual display information handling system including substantial range of view point, head position, and body position. Relative hinge angles may also vary by several degrees of orientation and may be set to any range of relative angles that meet the functional needs of the orientation mode. The orientation mode selected by the modular dynamic wireless power control system may depend on the working antenna systems as well as input from sensors detecting states of proximity, docking or other factors of the convertible information handling system with respect to SAR limitation on transmission power levels.

Figure 6E:
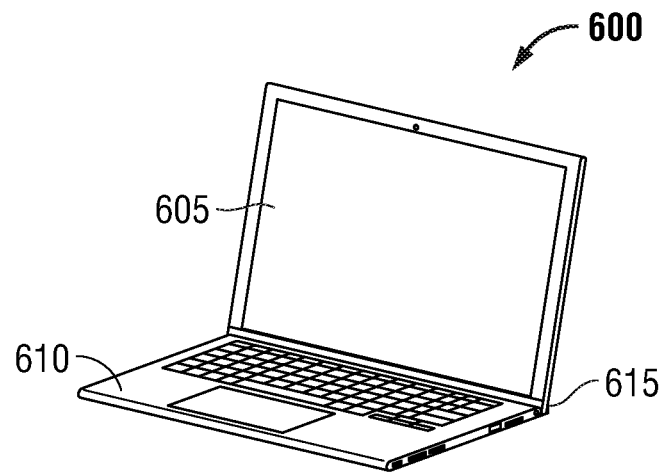
FIGS. 6E and 6F are graphic diagrams illustrating additional orientation modes related to docking of a convertible information handling system according to an embodiment of the present disclosure.
Figure 6F:
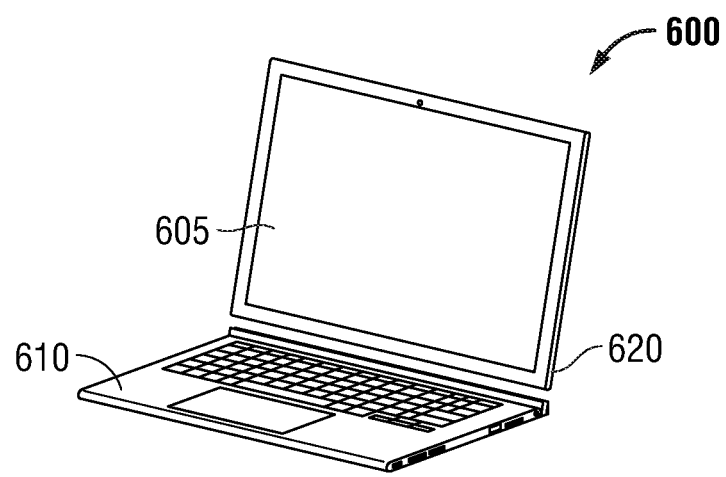

FIG. 6E and FIG. 6F show example docking states for determination of a orientation mode of the convertible information handling system 600 in an embodiment of the present disclosure. In the presently shown embodiments of FIG. 6E, display screen 605 and keyboard base 610 or a second display screen housing (not shown) are connected via a hinge 615 which may be a detachable hinge. In FIG. 6A hinge 615 is shown with the display screen and keyboard base attached. In FIG. 6B, hinge is shown disconnected at 620 between the display screen 605 and keyboard base 610. The docking states shown include a docked status in FIG. 6A and an undocked status in FIG. 6B contributing to determination of orientation mode. The docking states may be detected based on an I2C handshake between embedded controllers in the display screen 605 and the keyboard base 610 in some embodiments. In other embodiments, other methods of determining the attached or detached docking states may be used. For example, Hall Effect sensors, connector switches, loss of connection for other data or power lines or the like may indicate a detachment. Further, the docked status in FIG. 6A and an undocked status in FIG. 6B contribute to determination of orientation mode and may also be applied in example embodiments to a hinged dual tablet information handling system or a single screen, dual display screen housing information handling system where one display screen housing may replace the keyboard base in the determination of the orientation mode.

In other embodiments of the present disclosure, the hinge connection 615 may be disconnectable to permit the display screen 605 to operate as a tablet device separate from keyboard base 610 or as wirelessly connected separate devices. Hinge connection 615 may be also disconnectable to permit the two display screens to operate as a display screens connected by a wireless connection or as altogether independent information handling systems such as tablets in yet other embodiments with two display screens. Magnetic connectivity may maintain the hinge structure 615 when the hinge 615 is connected in some embodiments. Overcoming the magnetic force of hinge structure 615 may allow the hinge to be separated as in 620 of FIG. 6F. Wireless data connection between detachable two sides of a convertible information handling system or a dual display screen device may be made via wireless communication standards such as near field communication (NFC) per standards ISO 18000-3, ISO 13157 and related standards or low power Bluetooth based connections (e.g. IEEE 802.15.1) maintained between the detachable display screens. Further, one or either side of the convertible information handling system or a dual screen information handling system may have wireless antenna systems subject to SAR transmission power safety limitations.

Figure 7A:
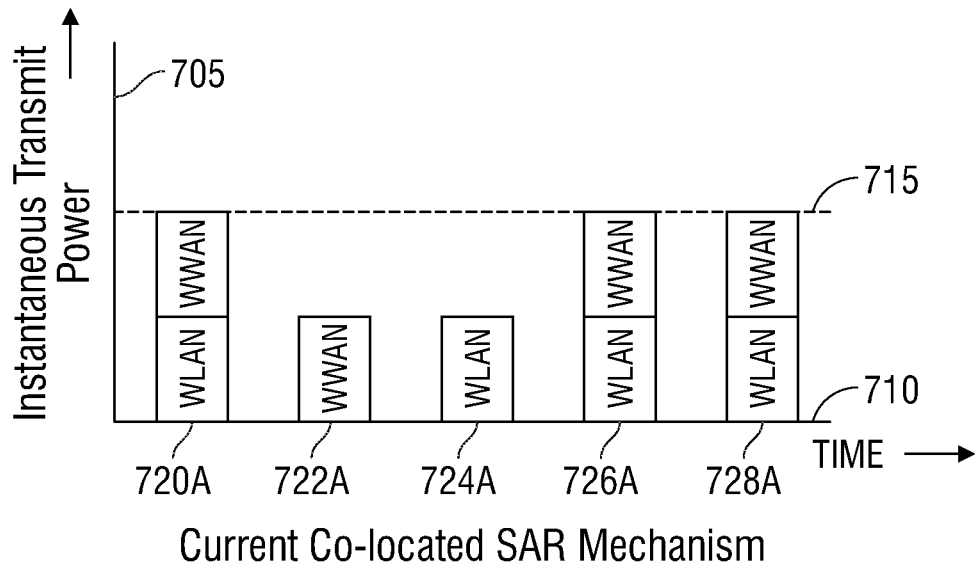
FIGS. 7A, 7B, and 7C are graphic diagrams illustrating dynamic control over transmission power with the control to maintain SAR levels according to an embodiment of the present disclosure.
Figure 7B:
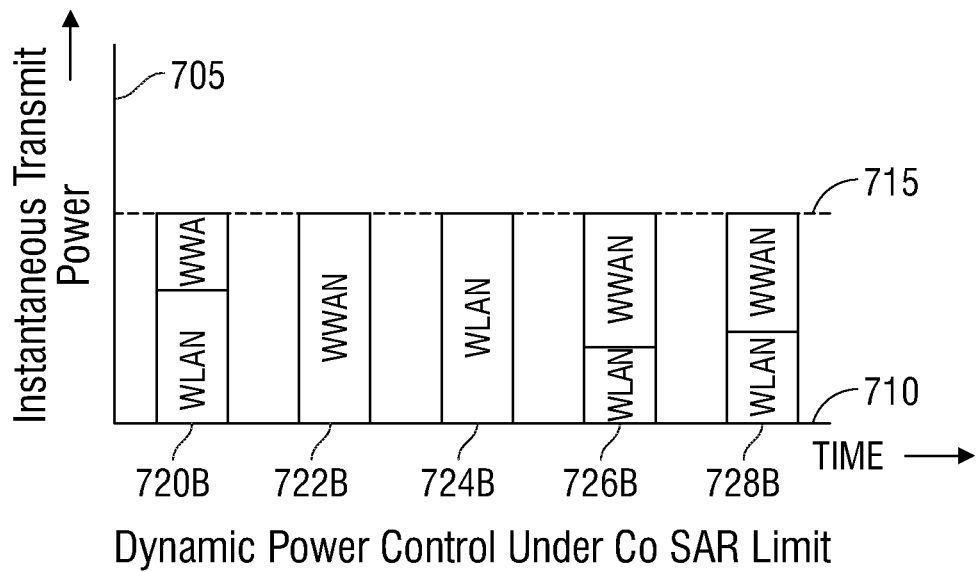
Figure 7C:
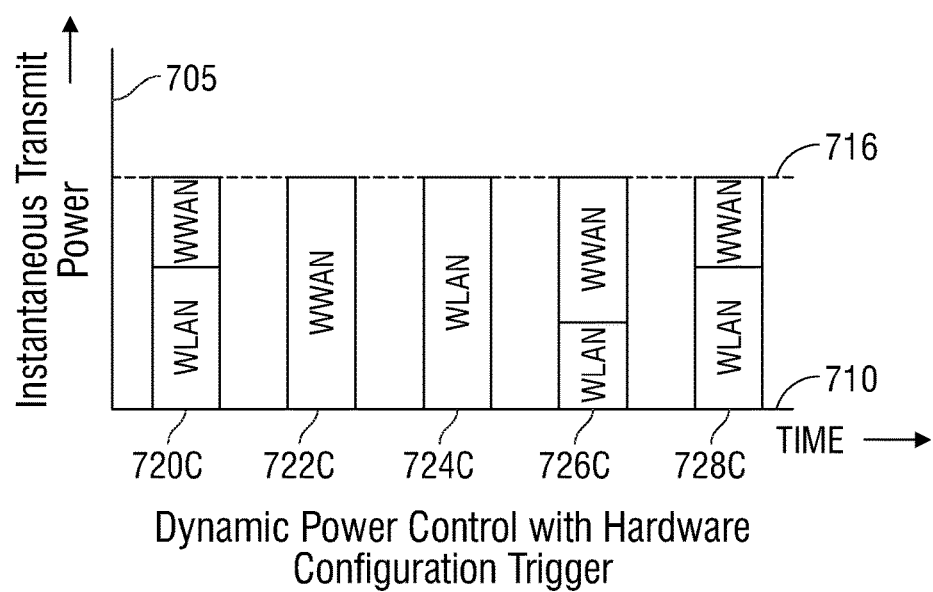

FIG. 7A, FIG. 7B, and FIG. 7C show a graphic illustration of the operation of the modular dynamic wireless power control system to dynamically adjust power between WLAN and WWAN transmitting antenna systems based on the determinations of data transmission traffic flow levels relative to current co-located SAR control mechanisms according to embodiments herein. FIG. 7A shows a graphical illustration of the operation of present co-located SAR mechanisms showing instantaneous transmit power levels along axis 705 over time along axis 710. Each bar graph shows an instantaneous transmit power level for both WWAN and WLAN combined. A maximum combined transmit power level 715 is shown across all points in time and is limited by the FCC or other SAR transmit power exposure regulations for information handling systems with a plurality of co-located antennas.

Depending on the type of information handling system, determination of maximum SAR exposure levels contemplates usage of those information handling systems within 20 cm of radiating sources such as the antenna systems or surfaces which radiate. In the present example, a SAR exposure limit may be limited to 1.6 W/kg for head or body exposure as set by the FCC (US) and ISED (Canada). In Europe, the SAR exposure limits are 2.0 W/kg under CE regulations. As an example embodiment, the maximum combined exposure power level 715 may be one of the above limits for simultaneously operating transmitters.

In current co-located SAR mechanisms it is assumed, during testing as well as for regular operation, that the antenna systems are fully operating as transmitting systems for purposes of SAR measurements. The total cumulative instantaneous power levels at 720A reach the maximum combined transmit power level 715, but if the WLAN is inactive at time 722A, then the remaining WWAN transmitter or transmitters operate as if the WLAN is still fully active in current SAR mechanisms. Similarly, if the WWAN is inactive as shown at time 724A, then the remaining WLAN transmitter or transmitters operate as if the WWAN is still fully active in current SAR mechanisms. At time 726A and 728A, both the WLAN and WWAN antenna systems are active again but power levels for each have remained consistent over each instantaneous time point. However, at time points where both WLAN and WWAN are active, it is noted that the distribution of data transmission levels between antennas may be substantially varied as the information handling system operates dynamically. Thus, current SAR mechanisms treat the WWAN and WLAN as if both operate at maximum level available under co-located operation maximum combined exposure power level 715. Current SAR mechanisms do not optimize the potential efficacy of concurrent RF transmissions.

By comparison, FIG. 7B shows one example embodiment where the modular dynamic wireless power control system dynamically adjusts power between WLAN and WWAN antenna systems according to an embodiment of the present disclosure. Other control is contemplated as well by the modular dynamic wireless power control system to dynamically adjust power between multiple WLAN antenna systems, multiple WWAN antenna systems, multiple WPAN system, or any combination of protocol types operating on co-located antennas as appropriate. For purposes of the present embodiment, one WLAN and one WWAN antenna or a plurality of WLAN and a plurality of WWAN antennas operating together, or some combination is illustrated.

FIG. 7B shows a graphical illustration of the operation of the modular dynamic wireless power control system showing instantaneous transmit power levels along axis 705 over time along axis 710. Each bar graph entry again shows an instantaneous transmit power level for both WWAN and WLAN combined. A maximum combined transmit power level 715 is shown across all points in time and is limited by the FCC or other SAR transmit power exposure regulations for information handling systems with a plurality of co-located antennas as explained.

It is understood that the total cumulative instantaneous power levels, as shown at 720B, 722B, 724B, 726B and 728B and in FIG. 7C are not strictly additive in most embodiments. The total cumulative instantaneous power levels are combined to increase when both or a plurality of transmitters are simultaneously operating, however the relationship of how the transmission power exposure levels add are dependent on location and orientation of the plural antenna systems with respect to one another across the wireless information handling system. The total cumulative instantaneous power levels depend in part on how close the source antenna systems are to one another for example. Antenna system systems farther away experience higher levels of attenuation with respect to each other. Thus, the cumulative effect of both or the plurality of transmitters simultaneously operating is lessened and not purely additive. Further, directionality of the wireless transmission propagation has a similar effect on how the simultaneous transmission power levels combine to yield the total cumulative instantaneous power levels at parts of the information handling systems tested for SAR exposure. Finally, whether antenna systems are actively transmitting or not will further change the dynamics of accumulation of the instantaneous power levels as spots on the information handling system.

During testing for SAR exposure levels, determination of "hot spots" may be made under various scenarios of simultaneous transmission. From that, it may be determined what the ultimate total cumulative instantaneous power levels are along surfaces and edges tested. These levels may then be associated with drive power levels sent to the antenna systems by the wireless modules and the front end controllers. A corresponding relationship may be made between the driving power levels to the antenna systems and the resulting total cumulative instantaneous power levels due to simultaneous transmissions. These may be recorded for various simultaneous transmission scenarios. In this way, reduction levels may be determined for power cutback tables such as the example embodiments described herein. Thus, the modular dynamic wireless power control system may provide for allocation of transmission power levels between a plurality of active antenna systems according to the various embodiments herein whether for WWAN and WLAN antennas simultaneously transmitting or additional antenna systems operating such as WPAN, WiGig, or a plurality of any of the above independently transmitting.

Although the total cumulative instantaneous power levels at 720B reach the maximum combined transmit power level 715 due to the operation of both WLAN and WWAN, the modular dynamic wireless power control system has determined a ratio difference of data transmission levels as between the WLAN antenna or antennas and the WWAN antenna or antennas. The determination of the levels of data transmission levels by the modular dynamic wireless power control system yields a power cutback of the WWAN operation in one example embodiment. In a further embodiment, the modular dynamic wireless power control system may provide a corresponding increase in power level of the WLAN operation, but not to exceed the maximum combined transmit power level 715. In this way, the transmitting antenna with the higher detected data transmission level may benefit from a higher transmission power level that is closer to a level it could operate at if no co-located antenna systems were present. The higher transmission power level provides for improved transmission quality and fewer errors in data transmission for that transmitting antenna; in this case the WLAN antenna or antennas at 720B. If the WLAN is inactive at time 722B, then the remaining WWAN transmitter or transmitters operate, but may increase power in an embodiment as if the WLAN were not present. WLAN may be considered inactive when the WLAN is turned off or in standby mode for example. The WWAN may operate at a maximum level as if no co-located antenna system were present at that point in time.

Similarly, if the WWAN is inactive at time 724B, then the remaining WLAN transmitter or transmitters operate, but may increase power in an embodiment as if the WWAN were not present. The WLAN may operate as if it were the only system present for that period of time. At time 726B and 728B, both the WLAN and WWAN antenna systems are active again. At 726B, the modular dynamic wireless power control system yields a power cutback of WLAN. This cutback may be due to lower data transmission levels determined for the WLAN in an example embodiment, such as when the WLAN is operating at background levels or is entirely operating in receive mode. In another embodiment, the higher WWAN antenna system data transmission levels may be permitted to implement a corresponding increase in power levels within the limitations of 715.

At 728B, the modular dynamic wireless power control system yields a power cutback of WWAN again. At this instantaneous time point a lesser cutback of WWAN transmission power may be warranted due to the determined relative data transmission levels of all active antenna types. For example, the relative data transmission levels between WLAN and WWAN antenna systems may be less than at 720B. In another aspect, the higher WLAN antenna system or systems may be permitted a corresponding increase in power levels within the limitations of 715.

As is shown, the modular dynamic wireless power control system may dynamically administer power cutbacks according to some embodiment. In another embodiments, the modular dynamic wireless power control system may also dynamically permit power level increases to within the limitations of 715. It is understood that the example embodiment of FIG. 7B may be applied to three or more independently transmitting antenna systems where each type of LTE or each type of WiFi or other antenna systems under other protocols may contribute to reaching a maximum combined transmit power level 715 and cutback adjustments may be made to one or more of the plurality of co-located active transmission systems. Remaining systems may be permitted transmission power level increases but within the maximum levels in other embodiments.

FIG. 7C shows application of the modular dynamic wireless power control system for an information handling system with a plurality of co-located antenna systems simultaneously transmitting. The total cumulative instantaneous power levels 705 are shown for particular times 710. The total cumulative instantaneous power levels are apportioned between a WWAN and WLAN transmitter in example embodiments and shown at 720C, 722C, 724C, 728C, and 728C. The overall maximum SAR power level 716 is at a higher setting level than that shown in FIG. 7B at 715. The higher overall maximum SAR power level limit 716 may be higher over the total cumulative instantaneous power levels permitted for the plural transmitting antennas due to a detected orientation mode that permits the higher overall levels. For example, higher overall maximum SAR power level limit 716 of FIG. 7C may be attributable to a laptop orientation mode detected by the module dynamic wireless power control system. The lower overall maximum SAR power level limit 715 of FIG. 7B may be attributed to a tablet orientation mode detected.

It is understood that the overall maximum SAR power level limit may dynamically switch between the levels allowable for cumulative, simultaneous wireless transmissions as the orientation of the convertible information handling system changes. Examples of orientation modes are discussed in embodiments herein. As is also shown, total cumulative instantaneous power levels 720C, 722C, 724C, 728C, and 728C in FIG. 7C are apportioned among the co-located antenna systems as before based on detected transmitting data levels and/or data priority levels assigned to data transmitted on the plural transmitting antenna systems. Operation of the dynamic power adjustment between simultaneous transmitting antenna systems may occur according to various embodiments herein, but the overall maximum SAR power level limits may also adjust due to orientation changes. Further, in some embodiments herein, overall maximum SAR power level limits may change as well due to detected proximity of a user near the information handling system or one or more of its antenna systems.

Figure 8:
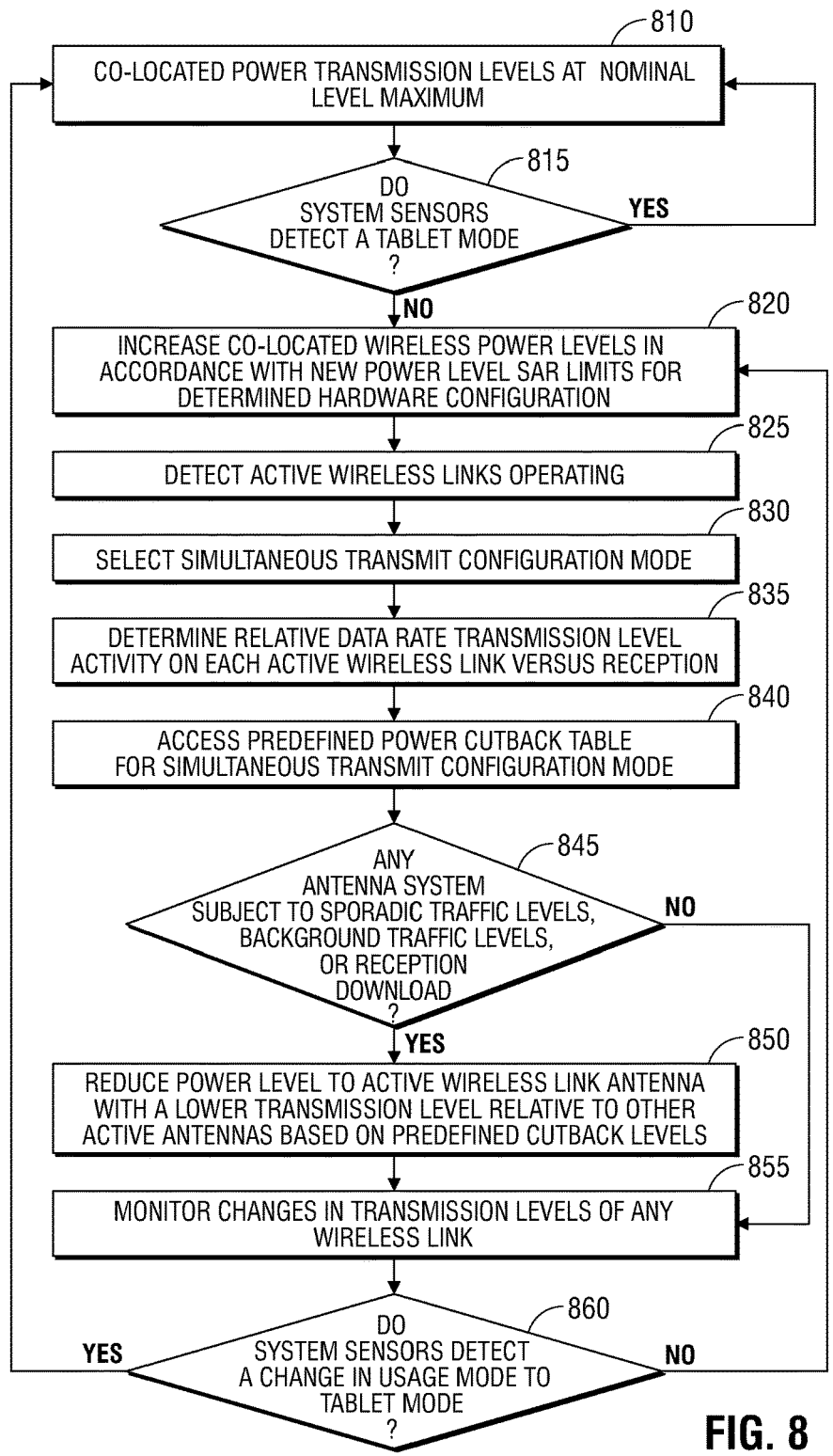
FIG. 8 is a flow diagram illustrating a method of modular dynamic wireless power control to maintain regulatory SAR levels for an information handling system according to an embodiment of the present disclosure.

FIG. 8 shows a flow diagram showing implementation of a modular dynamic wireless power control system for information handling systems according to one embodiment of the disclosure. Sensor data, docking state data, proximity data and data regarding other factors are received and processed to determine the orientation, motion, or states related to the orientation mode or proximity mode of the convertible information handling system. The method for implementation of the modular dynamic wireless power control system described in FIG. 8 may be also applied to a hinged dual tablet information handling system or a single screen, dual display screen housing information handling system where one display screen housing may replace the keyboard base in additional embodiments of the present disclosure and be applied similarly as understood.

Due to the reconfigurability of a convertible information handling system with respect to orientation, docking status or the like, the orientation mode or proximity mode of a convertible information handling system may be dynamically changed during usage. SAR safety requirements for maximum levels of power transmission by one or more antenna systems on an information handling system differ however between types of information handling systems as described above. For example a tablet device is subject to a more limited transmission power level due to the usage of the tablet information handling system such that human contact is likely with all surfaces and edges. Accordingly, one or more antenna systems are limited by SAR exposure limitations as to power permitted for transmission in a tablet relative to another type of information handling system that has a lower likelihood of direct contact with human tissue. For example, a desktop information handling system may not have a similar power level concern with respect to SAR limitations where likelihood human contact or close distance proximity with an antenna transmitter is low. It is understood that exposure levels for SAR of human tissue drop off with distance from a transmitter. Further, it is understood that strength of signal, reduction of interference, increased quality of wireless service, and reduced data errors or retransmissions are improved with increase antenna system transmission power. Thus, increase transmission power for actively transmitting antenna systems within limits of safety considerations is desirable.

In a particular example, a tablet information handling system may be set or required to limit transmission power levels to a maximum 14 dBm. A laptop information handling system however may only have considerations for surfaces under the keyboard base that may touch a human lap or edge locations that may be grabbed. Accordingly, a laptop information handling system may be set or required to transmission power levels to maximum 18 dBm which is higher than that of a tablet. Further, in some embodiments, a proximity detection system may be implemented with respect to locations near the transmitters, such as edges, to reduce transmission power upon detection of a user proximate to a transmitting antenna location. Such a proximity detection response may be used in connection with embodiments of the modular dynamic wireless power control system of embodiments of the present disclosure.

In an aspect of embodiments of the present disclosure, a convertible information handling systems or a dual display screen housing information handling system may be reconfigurable as to orientation. Accordingly, aspects of the present disclosure may dynamically adjust transmission power control maximum levels depending on orientation mode or proximity mode detected based on orientation, docking status and proximity detection depending accordance with requirements for the type of orientation mode or proximity mode detected. In an example embodiment, easel orientation mode and tent orientation mode may be subject to maximum SAR transmission power limitations similar to a laptop orientation mode due to similar risks of human tissue exposure. In other example embodiments, docking status of the information handling system with respect to a display screen detached from a keyboard base may be treated as a tablet orientation mode for limitations on maximum SAR transmission power limitations.

The process begins at 810 where the convertible information handling system is booted up and has implemented a modular dynamic wireless power control system. The boot kernel will invoke an initial transmission power level maximum limit setting for one or more orientation mode or proximity modes from provisioning that is default to the convertible information handling system upon boot up. That nominal level may be the set level at 810 for operation. In an example embodiment, before an orientation mode is determined, the lower transmission power level limitation for SAR exposure levels may be selected as a default. Upon a wake command from a dormant state or boot up, the most recent orientation mode stored in a memory device may be invoked as a nominal maximum SAR power level limit instead. Alternatively, the system may resort to a default orientation mode and power level maximum, such as from provisioning, upon receiving a wake command.

Proceeding to 815 of the present embodiment, sensor data may be received, such as through an accumulator sensor hub, relating to orientation of the convertible information handling system. Multiple orientation sensors in the convertible information handling system, including duplicate types of sensors as described in more detail above, may send data to the sensor hub or other aggregator of hardware sensor data. The sensor hub collects this data and may perform a fusion and grooming of the raw sensor data into a useable form of positional data for the convertible information handling system. A similar function may be applied to sensors in a dual screen housing information handling system having one or two display screens in those housing in other embodiments. In an embodiment, the sensor hub may communicate and receive data from the following sensors via a bus connection such as I2C and via an ACPI code operating in runtime BIOS and, in parts, on an operating system. Those sensors may include a digital gyroscope, an accelerometer, a geomagnetic field sensor, a Doppler shift detector, and/or an electric-mechanical hinge angle sensor, a Hall effect sensor, or others. One or more of these sensors may not communicate with the sensor hub, but may instead communicate directly with the processor chipset operating some or all of the modular dynamic wireless power control system. For example, the Doppler shift detector may be one or more microphones that directly connect to the processor chipsets via the audio system and its controllers. Other sensors, such as docking state sensors and proximity sensors discussed below may be connected though the sensor hub for fusion and grooming of raw sensor data, or they may be connected directly to the processor chipset operating the modular dynamic wireless power control system instructions.

At 815, the processor, such as the CPU operating an application or BIOS, determines what the orientation parameters and other detected factors are and matches those orientation parameters to one or more device orientation modes. For example, the processor running code instructions of modular dynamic wireless power control system may determine relative angle between a display screen and keyboard base and hinge azimuth orientation. The power management application also may determine 3-D spatial orientation of the dual display information handling system as a whole or the orientation of the display screen relative to the keyboard base or among display screen housings.

Additional sensor data may be considered by the modular dynamic wireless power control system to determine a usage state such as a touch or hover sensor or a proximity sensor detecting current status of user proximity to antenna systems on the information handling system. Docking state sensors may detect whether a display is connected via a detachable hinge to a keyboard base in some embodiments. In other embodiments, docking state sensors may determine if a convertible information handling system or other information handling system is docked to a docking station during operation. Each state sensors may be operated by independent drivers and data provided to the modular dynamic wireless power control system via a sensor hub or directly. Some, such as the touch/hover system may even have its own controller.

Upon receipt of the sensor data for orientation, the modular dynamic wireless power control system may determine an orientation state and, accordingly, orientation modes. With the orientation mode, the modular dynamic wireless power control system may then reference power tables to determine power control settings for one or more antenna systems to set operation within the maximum SAR power level limitations. Additional sensor data with respect to docking status or proximity of a user among other sensor inputs may provide additional detail in determination of orientation mode and such status data may determine additional changes or no changes to the power control levels in the power table as well.

One example embodiment of a power table that may be utilized by the modular dynamic wireless power control system is shown in Table 1.

TABLE 1

Orientation mode Power Characteristics

| TYPE | APPROXIMATE ORIENTATION | EXAMPLE POWER | PROXIMITY CONTEXT |
| --- | --- | --- | --- |
| Laptop orientation mode | Relative hinge angle 85° to 135°; Hinge azimuth at 0° and lying flat on surface. | Maximum transmission power level of 18 dBm. | Reduce power to proximate antenna by 0 dB. |

TABLE 1-continued

Orientation mode Power Characteristics

| TYPE | APPROXIMATE ORIENTATION | EXAMPLE POWER | PROXIMITY CONTEXT |
|---|---|---|---|
| Easel orientation mode | Relative hinge angle 250° to 340°; Hinge azimuth at 90°; one display screen face-down. | Maximum transmission power level of 16 dBm. | Reduce power to proximate antenna by −2dB. |
| Tent orientation mode | Relative hinge angle 200° to 340; Hinge azimuth at 90°. | Maximum transmission power level of 18 dBm. | Reduce power to proximate antenna by 0 dB. |
| Tablet orientation mode | Relative hinge angle 340° to 360°. | Maximum transmission power level of 14 dBm. | Reduce power to proximate antenna by −4 dB. |
| Dual tablet orientation mode | Relative hinge angle 160° to 200°. | Maximum transmission power level of 13 dBm. | Reduce power to proximate antenna by −5 dB. |
| Tablet orientation mode | Hinge status: tablet undocked | Maximum transmission power level of 14 dBm. | Reduce power to proximate antenna by −4 dB. |
| Desktop docked device orientation mode | Desktop dock status: docked | Maximum transmission power level of 18 dBm. | Reduce power to proximate antenna by 0 dB. |

It is understood that the entries in Table 1 are only exemplary for purposes of discussion and any approximate orientation value ranges or any power level adjustments or additional modifications may be utilized in various embodiments. It is understood that the values in the above Table 1 may vary based on several factors. For example, maximum transmission power levels may depend on the radio technology and may further vary depending on factors such as frequency band or channel as understood. Accordingly, other values may be used in place of the maximum values or relative cutback values in various embodiments.

The modular dynamic wireless power control system will determine the orientation mode at 815. If the orientation mode is a tablet mode, such as based on orientation or hinge detachment of a display screen for the convertible information handling system, then flow will return to 810 to maintain the maximum power transmission level at the nominal or default level which is lower for tablet computing devices.

If, however, the modular dynamic wireless power control system determines that another orientation mode is operating then flow may proceed to 820. At 820, the modular dynamic wireless power control system will instruct the wireless adapter or adapters for the one or more antenna systems to permit transmission power to the level as described in the power table. For example, the power table embodiment of Table 1 above may determine a higher maximum transmission power level if the orientation mode is determined to be a laptop orientation mode, a tent orientation mode, or an easel orientation mode. Since those modes in the example embodiment of Table 1 are treated similarly with respect to power level limits, the new maximum SAR power level limit may be set to the higher level in an embodiment by the modular dynamic wireless power control system. In other embodiments, orientation mode configurations may have several varied maximum SAR power level limits and the modular dynamic wireless power control system may adjust according to the orientation mode determined.

With the maximum SAR power level limitation set, dynamic power level adjustment by the modular dynamic wireless power control system between the one or more active wireless links to apportion transmission power level according to an embodiment. For example, apportionment of transmission power levels may be conducted according to several embodiments and will, in part, depend on the number of active wireless transmission systems transmitting as described above. Those links may simultaneously operate in the same or similar wireless protocols such as with MIMO operation, may be independently operate across a plurality a plurality of protocols, or some combination of the above. At 825, the modular dynamic wireless power control system may detect which wireless links, and which corresponding antenna systems, are active. In other words, instead of assuming all antenna systems are fully active and operating as transmitters, a wireless interface device or a plurality of wireless interface devices will determine if a corresponding module for operating in a wireless protocol is activated and operating. In some cases, wireless protocols and their corresponding antenna systems in an information handling system may be turned off or in a dormant or sleep mode or may have no connectivity.

Based on the active versus inactive wireless links operating on the information handling system, the modular dynamic wireless power control system will select a simultaneous transmit configuration mode at 830. The simultaneous transmit configuration mode is the selection of antenna systems co-located on an information handling system that are determined to be currently in operation. In other words they are on, not in dormant or sleep mode, or have potential connectivity. Either or any combination of the above criteria may be used to determine that a wireless link is in an active state. The modular dynamic wireless power control system may coordinate information from a plurality of wireless interface devices. In particular, indicators may be received relating to the activation state of the plurality of wireless antenna systems on the information handling system. In an example embodiment, any of a plurality of simultaneous transmit configuration modes may be selected. The following table illustrates a plurality of simultaneous transmit configuration modes.

TABLE 2

| Active Link Types | Simultaneous transmit configuration modes |
|---|---|
| LTE | LTE Band 2/4/5/12/13/25/26/30/41 |
| LTE + BT | LTE Band 2/4/5/12/13/25/26/30/41 + BT |
| LTE + WiFi | LTE Band 2/4/5/12/13/25/26/30/41 + 2.4 GHz WiFi |
| | LTE Band 2/4/5/12/13/25/26/30/41 + 5.0 GHz WiFi |
| | LTE Band 2/4/5/12/13/25/26/30/41 + 2.4 GHz WiFi + 5.0 GHz WiFi |
| LTE + WiFi + BT | LTE Band 2/4/5/12/13/25/26/30/41 + 2.4 GHz WiFi + BT |
| | LTE Band 2/4/5/12/13/25/26/30/41 + 5.0 GHz WiFi + BT |
| | LTE Band 2/4/5/12/13/25/26/30/41 + 2.4 GHz WiFi + 5.0 GHz WiFi + BT |
| WiFi + BT | 2.4 GHz WiFi + BT |
| | 5.0 GHz WiFi + BT |
| | 2.4 GHz WiFi + 5.0 GHz WiFi + BT |
| WiFi | 2.4 GHz WiFi |
| | 5.0 GHz WiFi |
| | 2.4 GHz WiFi + 5.0 GHz WiFi |
| BT | BT |

As shown above in Table 2, a plurality wireless link system types may be active. Combinations of wireless link types may be reported as active to the modular dynamic wireless power control system. Within each combination of wireless link type, several options of simultaneous transmit configuration modes are possible. As shown above, LTE may operate in several radiofrequency bands and, thus, may yield substantially more simultaneous transmit configuration modes than shown above. For brevity, the possible combinations of LTE bands operational with co-located antennas are shown with slashes between the various bands. Any combination of some or all of these LTE bands may be utilized and each combination may yield its own simultaneous transmit configuration mode as can be appreciated.

Further, several options for WiFi operation may be permitted including 2.4 GHz, 5 GHz and any other frequency bands contemplated for WiFi operation. In another aspect, WiFi may operate on a plurality of radio transmitters to operate in MIMO versus single transmitter operation or single chain operation. The plurality of MIMO operating radio transmitters may both be in 2.4 GHz, 5 GHz, a combination, or another contemplated frequency band. This multiple transmitters versus single transmitter operation provides for additional antenna systems that may be operation for each band of WiFi. Thus, several additional options for WiFi may yield more simultaneous transmit configuration modes than shown above. Again for brevity, this level of detail has been omitted from Table 2. Moreover it is understood that the modular dynamic wireless power control system may dynamically control many other types of antenna systems on an information handling system. It can be appreciated that more simultaneous transmit configuration mode combinations may be added with WiGig capability, utilization of WPAN technologies, or various others. In addition, it is contemplated that WCDMA may be used in place of LTE or in addition to LTE to add yet more simultaneous transmit configuration mode possibilities or different possibilities to the above Table 2.

The modular dynamic wireless power control system may be operational at a wireless interface device or may operate at an operating system level. Further, the modular dynamic wireless power control system may operate as a software application or as part of a BIOS system in whole or in parts. Data to determine active wireless links for determining the simultaneous transmit configuration modes may be gathered by the modular dynamic wireless power control system from multiple drivers or wireless interface devices.

Flow may proceed to 835 to further determine relative data transmission level activity of each of the wireless links. Determination of levels of activity may be assessed by the modular dynamic wireless power control system from data reported by various parts of the information handling system. For example, levels of transmission or reception of data wirelessly may be assessed from data reported from wireless antenna system drivers/modules, antenna system controllers, other aspects of the wireless interface devices, or from OS activity of software and other applications connecting with or seeking transmission or reception of data with one or more antenna systems. Queues and pre-loaders may be integral to assessing levels or types of data (streaming, bursty, background, etc.) that are set for transmission in one embodiment. In other embodiments, determination of transmission levels versus reception levels, during which transmission power is limited, may be assessed from similar sources.

The modular dynamic wireless power control system will compare relative transmission levels for each of the active wireless links or may designate threshold definitions for data transmission levels. This may include threshold determinations for transmission levels, ratios of reception activity versus transmission activity, priority level assessments of data transmissions based on type and applications seeking transmission, and similar considerations.

Data priority level assessments may be related to whether the data type to be transmitted is of a type that may tolerate delays or limitations. For example, streaming data such as streaming broadcasts of communications from an information handling system, or web responses by users would have high priority and low tolerance for delays or errors in some aspects. Transmission of data back-ups in other examples may however have a lower priority and a higher tolerance of delays. Thus, a high level of data transmission over an antenna system may in some embodiments garner a dynamic adjustment of power in favor of that antenna system. In other embodiments, the determination of dynamic power control and power allotment to a high volume transmitter may be tempered by the priority level of the high volume of data compared to other data to be transmitted. High priority data may supersede the dynamic power allotment to a high volume transmitter. It is understood that allowing an antenna system to operate at higher power is advantageous to transmission quality, reduced errors and delays, and other improvements in wireless link communication. However, this is limited by FCC and other regulating body SAR limitations as well as power consumption considerations. The antenna traffic levels are utilized by the modular dynamic wireless power control system to determine dynamic power control apportionment among active wireless links within the maximum SAR power limitations determined by the orientation modes as described herein. Higher transmitting levels, higher data priority levels, or some combination may be utilized by the modular dynamic wireless power control system to dynamically control power for transmitters in the information handling system.

In an embodiment, flow proceeds to 840 where the modular dynamic wireless power control system may access a matrix of predefined power cutback tables. The predefined power cutback tables may determine a power reduction only for wireless transmissions by some antenna systems that have lower expected volumes of transmission, lower priority transmissions, or some combination of the same. In further embodiments, the predefined power cutback tables may indicate a reduction in power levels permitted by lower volume or lower data priority transmitters as well as a corresponding increase in power levels allowed by higher volume/priority transmitters. It is understood that any increase in power levels for higher volume/priority transmitters must still fall within the cumulative maximum SAR power level limitations for that selection of plurality of transmitting antennas. Any corresponding increase of transmission power levels may be up to a level permitted for this higher volume/priority transmitter as if it were operating without other active transmitters in some embodiments. The matrix of power cutback tables accessed by the modular dynamic wireless power control system may be particular to simultaneous transmit configuration modes determined above. It is appreciated that several types of power cutback tables may be used. The following are example embodiments of power cutback tables used with a modular dynamic wireless power control system.

In the following example embodiments, modular dynamic wireless power control system may dynamically alter the concurrent power levels of the plurality of antenna systems or even shared antenna systems based on a predefined power cutback table or tables. Antenna power adjustments for one or more co-located antenna systems in response to determination of a simultaneous transmit configuration modes and traffic levels for transmission or reception activity are shown below. An example predefined power cutback table is shown below in Table 3 for a WiFi standalone simultaneous transmit configuration mode with LTE turned off or otherwise not operating or active.

TABLE 3

Predefined power cutback table (WiFi Standalone)

| Co-located usage mode | WiFi 2.4 GHz | WiFi 5 GHz | LTE Band A | LTE Band B | LTE Band C | LTE Band XX |
|---|---|---|---|---|---|---|
| Simultaneous transmit traffic on WiFi 2.4 and 5 GHz | 0 dB | 0 dB | — | — | — | — |
| Upload traffic on WiFi 5 GHz. Sporadic traffic on WiFi 2.4 GHz | 2 dB | 0 dB | — | — | — | — |
| Upload traffic on WiFi 5 GHz. Background traffic on WiFi 2.4 GHz | 4 dB | 0 dB | — | — | — | — |
| Upload traffic on WiFi 2.4 GHz. Sporadic traffic on WiFi 5 GHz | 0 dB | 2 dB | — | — | — | — |
| Upload traffic on WiFi 2.4 GHz. Background traffic on WiFi 5 GHz | 0 dB | 4 dB | — | — | — | — |

Another example predefined power cutback table is shown below in Table 4 for an LTE standalone simultaneous transmit configuration mode with WiFi not active. A cutback table with additional bands or transmitters in either WiFi or LTE is also contemplated, for example the designation LTE Band XX may indicate additional LTE Bands are contemplated.

TABLE 4

Predefined power cutback table (Cellular Standalone)

| Co-located usage mode | WiFi 2.4 GHz | WiFi 5 GHz | LTE Band A | LTE Band B | LTE Band C | LTE Band XX |
|---|---|---|---|---|---|---|
| Heavy transmit upload traffic | — | — | 0 dB | 0 dB | 0 dB | 0 dB |
| Moderate transmit upload traffic | — | — | 2 dB | 2 dB | 2 dB | 2 dB |
| Sporadic upload traffic | — | — | 4 dB | 4 dB | 4 dB | 4 dB |
| Light upload traffic | — | — | 6 dB | 6 dB | 6 dB | 6 dB |
| Background traffic | — | — | 8 dB | 8 dB | 8 dB | 8 dB |

Yet another example predefined power cutback table is shown below in Table 5 for a combined WiFi and LTE operational simultaneous transmit configuration mode.

TABLE 5

Predefined power cutback table (Cellular + WiFi)

| Co-located usage mode | WiFi 2.4 GHz | WiFi 5 GHz | LTE Band A | LTE Band B | LTE Band C | LTE Band XX |
|---|---|---|---|---|---|---|
| WiFi upload traffic; LTE standby | 0 dB | 0 dB | 8 dB | 8 dB | 8 dB | 8 dB |
| Moderate transmit upload traffic | 2 dB | 2 dB | 6 dB | 6 dB | 6 dB | 6 dB |
| Sporadic upload traffic | 4 dB | 4 dB | 4 dB | 4 dB | 4 dB | 4 dB |
| Light upload traffic | 6 dB | 6 dB | 2 dB | 2 dB | 2 dB | 2 dB |
| Background traffic | 8 dB | 8 dB | 0 dB | 0 dB | 0 dB | 0 dB |

While Table 3, Table 4, and Table 5 are illustrative of co-located SAR cutback tables for power cutback among plural antenna systems operating on an information handling system, these tables are understood to be an example set of data for discussion purposes that may have additional aspects or may be different for various models of information handling systems. Many variations of simultaneous transmit configuration modes are contemplated. Further, many variations on the levels of co-located usage modes may also be defined based on measured data transmission activity levels or a ratio between transmissions and reception in various embodiments. In other embodiments, the co-located usage modes may also incorporate data type priority considerations associated with permissible power cutback levels (not shown).

Thus, it is understood that Table 3, Table 4, and Table 5 above show only an example set of co-located antenna SAR cutback adjustment policy for an information handling system. The example tables may further be only part of a wider matrix of tables or data of the overall antenna power adjustment policy for a plurality of simultaneous transmit configuration modes on the information handling system. Further details of the operation of the modular dynamic wireless power control system implementing dynamic power cutback policy for a plurality of RF antenna systems operating on an information handling system are described in embodiments herein.

The predefined power cutback table may be different when utilized within different models of information handling systems or depending on administrative settings but may generally ensure that the co-located SAR levels operating with a plurality of antennas remains below a regulatory safety level. For example, the power cutback table may be particular for various models of information handling system and tailored to the types of antenna locations and utilization on those devices as well as orientation changes that are possible and SAR safety requirements for those particular devices. Moreover, some or all of the available antenna systems above may be inactive and this may change the cutback table for some or more of the antenna system types. For example, one or more LTE antennas may not be actively operating or may not operate under a MIMO operation, but instead may have independent LTE wireless links from which distinct wireless data streams are connected. Upon being installed into and configured for a model of an information handling system, a custom set of cutback tables may be used with the co-located SAR dynamic adjustment system to maintain transmission power levels within the regulatory limits but provide for dynamic adjustment depending on dynamic activity among the antenna systems.

At 845, the modular dynamic wireless power control system shall determine if any active wireless link on an antenna system will operate with sporadic traffic levels, background traffic levels, or operate in a largely reception download state as compared to a full transmission upload operation. If all active wireless links are in full transmission upload, then flow proceeds to 855 where the modular dynamic wireless power control system will continue to monitor any changes in transmission levels. Additionally, the modular dynamic wireless power control system will monitor for added or subtracted active wireless links. In this way, the modular dynamic wireless power control system may maintain dynamic power control over the co-located antenna systems.

In another example embodiment, the modular dynamic wireless power control system at 845 will assess active wireless links for disparity of data priority levels. If the data priority levels and expected transmission volumes are not different, then in this embodiment flow may proceed to 855 for ongoing monitoring of the status of the active wireless links and for changes in activity. At 855, the modular dynamic wireless power control system may also monitor for changes in transmission data types at antenna systems which may reset data priority levels.

If at 845, any active wireless link will operate with sporadic traffic levels, background traffic levels, or operate in a largely reception download state, then flow may proceed to 850 in one embodiment. In other embodiments, the priority level of data transmission levels may be assessed at 845. If the assessment of priority is distinct between at least one active antenna system and the other wireless links, then flow may proceed to 850. Additional criteria may be used in determining power level apportionment among active wireless links by the modular dynamic wireless power control system in other embodiments.

At 850, the modular dynamic wireless power control system will reduce power levels to active wireless links based on lower data transmission levels relative to other active antenna systems. In another embodiment, power reduction may occur based on relative data priority rankings for data to be transmitted on the plurality of active antenna systems. In either embodiment, the reduction levels may be based on the cutback tables accessed for the simultaneous transmit configuration mode detected as described herein. The modular dynamic wireless power control system may then create an instruction to antenna system power controllers to reduce transmission power levels by the predetermined amount for one or more antenna systems.

In another embodiment, the modular dynamic wireless power control system may determine a cutback level and calculate or access a pre-determined allowable increase in other co-located active antenna systems. The corresponding transmission power level increase is limited to within the maximum allowable SAR levels as predetermined by system testing. With the calculated or pre-determined allowable increase for one or more other antenna systems, the modular dynamic wireless power control system will determine an instruction to increase the allowable power transmission levels of another or a plurality of other active antenna systems. This instruction may be delivered to one or more power controllers associated with the affected antenna systems.

After implementation of the active power adjustment, flow may proceed to 855 where the modular dynamic wireless power control system will continue to monitor any changes in transmission levels. In other aspects, the modular dynamic wireless power control system may also monitor for added or subtracted active wireless links as described before. If a change is detected, the flow may return to 825 for a re-assessment of which wireless links are active in the information handling system and the co-located antenna dynamic power control may proceed as before with dynamic power control of the plurality of active wireless links and the corresponding antenna systems. While the modular dynamic wireless power control system continues to monitor for changes in data transmission levels or even data priority levels, flow may proceed to 860.

At 860, the modular dynamic wireless power control system will also continue to monitor for changes in orientation, docking sensor state or other factors in determining orientation mode. In the example embodiment, if the modular dynamic wireless power control system detects a change to the orientation mode to a mode other than the tablet mode, such as laptop, tent, or easel orientation modes as shown in Table 1, then flow will return to 820 to maintain the maximum SAR power level limits. In other embodiments, the modular dynamic wireless power control system may alter the maximum SAR power level limits to a new level in accordance with the newly detected orientation mode.

If the modular dynamic wireless power control system detects that the change in orientation mode has returned to the tablet mode or a orientation mode with a similarly restrictive maximum SAR power level limit, flow may return to 810 to implement a default or lower maximum SAR power level limit as appropriate for operation as a tablet device. According to the embodiments of FIG. 8, the modular dynamic wireless power control system may thus monitor any changes to the orientation modes, including docking status, of the convertible information handling system and adjust the maximum SAR power level limit dynamically depending on the detected orientation mode. In some embodiments, this may switch between two levels of maximum SAR power level limit. In other embodiments, the modular dynamic wireless power control system such as described in the embodiments herein may dynamically switch between a plurality of maximum SAR power level limits as orientation modes are changed. Similarly and as described above, application of the modular dynamic wireless power control system may be made to a hinged dual tablet information handling system or a single screen, dual display screen housing information handling system where one display screen housing may replace the keyboard base in the determination of the orientation mode and application of power control.

Figures 1, 9:
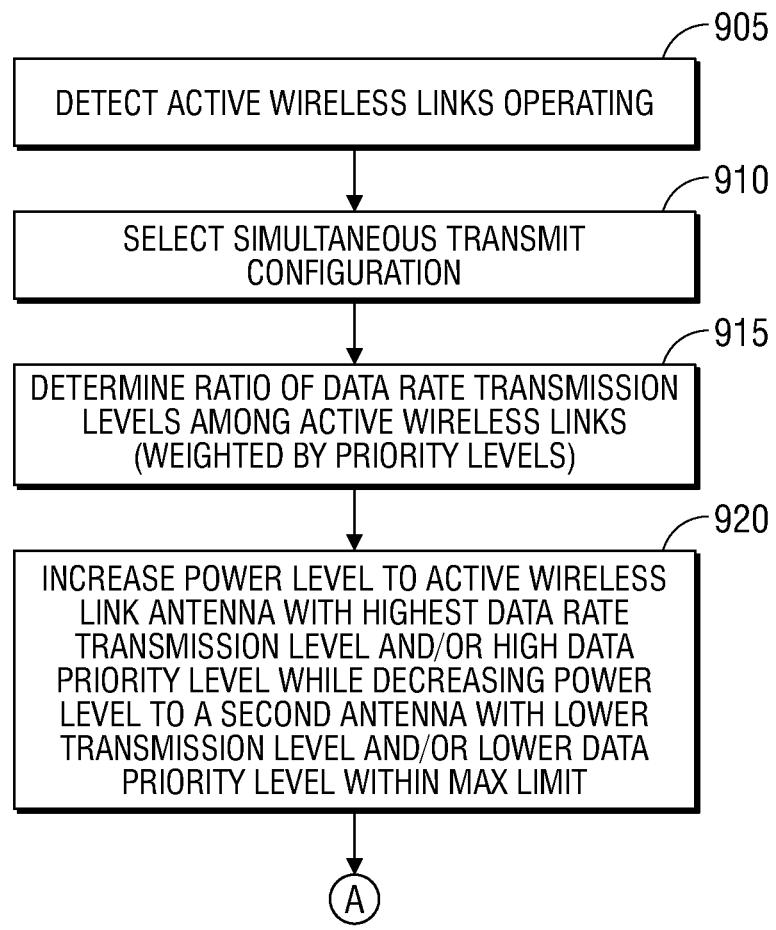
Figures 2, 9:
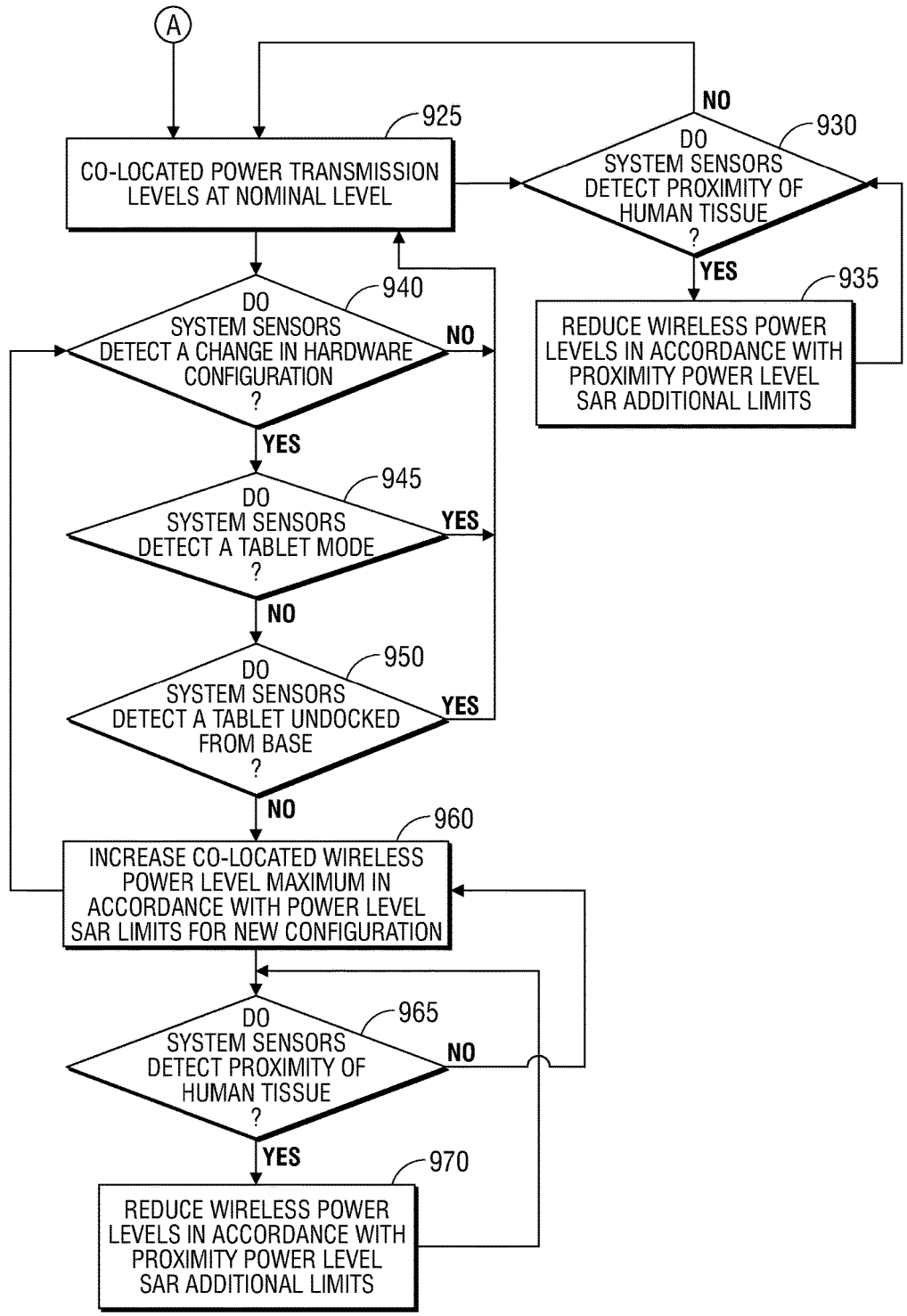

FIGS. 9-1 and 9-2 shows another method for operating a modular dynamic wireless power control system for determining power control adjustments for antenna systems according to additional embodiments of the present disclosure. As described in embodiments herein, sensor data, docking state data, proximity data and data regarding other factors are received and processed to determine the orientation, motion, and other states related to determining the orientation mode or proximity mode of the convertible information handling system. Due to the reconfigurability of a convertible information handling system with respect to orientation, docking status, or the like, the orientation mode of a convertible information handling system may be dynamically changed during usage. SAR safety requirements for maximum levels of power transmission by one or more antenna systems on an information handling system differ however between types of information handling systems as described above. In an example embodiment, a convertible information handling system may be used as one of several types of information handling systems depending on a current configuration. Further, those configurations may dynamically be changed by the user. The modular dynamic wireless power control system may similarly dynamically change maximum allowed transmission power levels and dynamically alter antenna transmission power levels due to proximity detection. In a particular example, a tablet information handling system may be required to limit transmission power levels to a maximum that is lower than a laptop information handling system. Accordingly, reconfiguration between a tablet orientation mode and a laptop orientation mode may trigger a change in the maximum SAR power level limits accordingly. Further, detection of proximity of a user near an antenna system may cause a further reduction of power levels to that antenna system as discussed in the embodiment of FIGS. 9-1 and 9-2. Thus, the modular dynamic wireless power control system may adjust maximum SAR power level limits to one or more antennas of the convertible information handling system based on orientation, docking status, proximity detection, or other hardware sensor determinations. Further, the embodiments of FIGS. 9-1 and 9-2 illustrate dynamic power allocation among active antenna systems due to determined data transmission levels on those antenna systems or priority levels of data transmitted on those antenna systems. These maximum SAR power level limits are applied to the cumulative power transmission levels allocated among active antenna systems.

At 905, the information handling system operates a modular dynamic wireless power control system to determine active wireless links from a plurality of wireless antenna systems available on an information handling system. The modular dynamic wireless power control system may receive indications of active status from any of several aspects of an information handling system including drivers, controllers in a wireless interface device, software or hardware control settings for antenna systems, or OS operation including operating software applications and firmware seeking to send or receive data wirelessly. The modular dynamic wireless power control system may be initialized upon start up to actively monitor the ongoing status of active wireless links or to monitor data rate transmission/reception levels or changes in types of antenna system usage based on the types of data to be transmitted or received by operating software or hardware applications. Active antenna system status may include determination of antenna systems that have not been turned off, antenna systems that are not dormant due to available wireless connectivity, or antenna systems that have not been placed into a sleep mode or other inactive state for other various reasons understood to impact usage of wireless links.

Upon determining which wireless links are active and which wireless antenna systems will be active, flow proceeds to 910. At 910, the modular dynamic wireless power control system establishes which combination of antenna systems may be operating simultaneously to either transmit or receive data. In one example embodiment, the combination of active antennas establishes which of a set of simultaneous transmit configuration modes is operational. In one aspect, the modular dynamic wireless power control system may then determine which of a matrix of cutback tables may apply to dynamic power reduction measures. In another aspect, the simultaneous transmit configuration mode identified may invoke a set of calculations for power reduction levels relative to an information handling system type due to locations of antenna systems and SAR measurement characteristics of the information handling system in an embodiment.

For example, the power level cumulative maximum limits may be determine in part by which simultaneous transmit configuration mode is determined to be operating. This along with the orientation mode of a convertible information handling system or the proximity mode may determine the maximum SAR power level limits for cumulative instantaneous transmit power for all active transmitters.

Proceeding to 915, the modular dynamic wireless power control system determines relative data transmission rates or activity of each active antenna system of the simultaneous transmit configuration mode. Transmission rates or activity may be assessed from an OS and BIOS operating to establish wireless links for connectivity to data transmissions and data reception. As described, application software may indicate the level of transmission or reception activity based on the type of application operating. For example, a video player or music player may indicate largely downloaded reception activity. Database back-up software may indicate largely transmission upload data activity. Web browser operation or online gaming software may indicate various levels of transmission and reception. Similarly, communication software such as videoconferencing software, VoIP, internet messaging, email, texting or the like may similarly invoke various levels of transmission and reception depending on activity state.

In other aspects, data queues or pre-loaders for data transmissions may be assessed for activity to determine data transmission levels. In yet other aspects, ongoing transmission activity levels reported from wireless interface devices or RF front end systems associated with antenna system types may report on upload transmission activity and reception activity. Any of these inputs may be used to determine relative data rate transmission levels among active wireless links.

The modular dynamic wireless power control system may also determine priority levels of types of data set for transmission on the various active antenna systems in the simultaneous transmit configuration determined at 915. The priority levels may be assigned due to impact on user experience for example. Streaming communication software such as videoconferencing software, VoIP or the like may not tolerate a reduction in signal quality at lower power levels and may be reserved to maintain higher transmission power levels by the modular dynamic wireless power control system. Similarly web browser or web gaming applications may not tolerate interruptions or degradation, and thus may be assigned a higher priority for transmission. Other communication software systems such as internet messaging, email, texting or the like may be bursty and some allowance made for finding opportune transmission windows or repeat transmissions to a degree. One or more of these may be allowed a lower data priority level for transmission and tolerate lower transmission power levels. Backup data uploads by the same token may be low priority data in an example. Similarly, background data upload responses such as for pinging responses or ongoing communication links during downloads may similarly have low data priority levels. Also, wireless links may be in a scanning mode seeking connectivity where transmission may also be low priority relative to other actively transmitting wireless links.

With the above ratio of data transmission levels or priority levels of data transmissions identified, the modular dynamic wireless power control system determines a ratio of allocated power levels to be assigned among active antenna systems in view of the ratio of current and anticipated data rate transmission levels detected. In an example embodiment, a direct ratio of detected data rate transmission levels among active wireless links may determine a share of the cumulative allowed transmission power levels under SAR limits. In another embodiment, a weighting factor may be applied to ensure that one or more wireless links are not reduced in power so much so that transmission is ineffective. Thus, the share of power allocated among active wireless links is made with a weighted proportionality or there is a maximum reduction permitted for any one active wireless link. Maximum allowed power level of any one active wireless link may be subject to a threshold or capped setting level as well. In one example, that threshold maximum may be the maximum for that wireless link operating alone. Other maximum threshold levels may be used.

In another embodiment, the modular dynamic wireless power control system may assess the data priority levels of the types of data to be transmitted on each of the active wireless links. The data priority levels may be ranked and a highest ranking, such as with ongoing streaming communication uploads, may be immune to power reduction at corresponding active wireless links. Data transmitters responsible for transmitting highest priority data may instead be subject to available increases in power. In other embodiments, the data priority level ranking may be used as a weighting factor in the determination by the modular dynamic wireless power control system of apportionment of power levels. The apportionment of power levels may be applied to the ratio of relative data transmission levels among the active antenna systems. Again, maximum or minimum threshold levels of power may be used to ensure no active wireless link is reduced by too substantial an amount to be rendered ineffective.

In yet another embodiment, a cutback table may be used as shown above but modified to include predetermined reduction levels or increase levels based on both data rate transmission levels and data priority levels. The selection of the cutback table may be made according to a simultaneous transmit configuration determined as well as a matrix of the types of data to be transmitted on each of the active wireless links. It is understood, that the cutback tables may be of a variety of types used to assist the modular dynamic wireless power control system in dynamically altering the power levels of active wireless links as needed.

At 920, the modular dynamic wireless power control system may provide one or more instructions to wireless interface devices and RF front end systems for the active wireless antenna systems. In one example embodiment, as between two active antenna systems, the modular dynamic wireless power control system may send an instruction to increase the power level to the antenna system having the higher data transmission rate and/or higher assessed data priority level in a level commensurate with an instruction to decrease a second antenna system power level that has a lower transmission level and/or a lower data priority level. It can be appreciated, that a plurality of antenna systems may be dynamically controlled for power levels depending on the simultaneous transmit configuration mode applicable and the relationship or ratio of transmission levels or data priority levels that apply. Determination of power level adjustments among the plurality of active wireless antenna systems may then be made by the modular dynamic wireless power control system in accordance with embodiments herein.

It is understood that the modular dynamic wireless power control system will monitor for changes in anticipated data rate transmission levels or data priority levels on any active wireless link. If no changes are detected, the levels established at 920 continue and ongoing monitoring will be conducted by the modular dynamic wireless power control system. However, if a change is detected to the data rate transmission levels (or the data priority levels) of any active wireless link of the information handling system, then the modular dynamic wireless power control system would re-adjust accordingly and determine if simultaneous transmit mode still applies as in 910 or if the ratio data rate transmission levels between active antenna systems, as weighted by priority levels, has changed as in 915. The modular dynamic wireless power control system may monitor and operate to adjust allocated power between active antenna systems in accordance with the above embodiments.

Flow may proceed to 925 where the modular dynamic wireless power control system may set a maximum SAR power level limit dynamically depending on the simultaneous transmission mode and orientation of the device. The modular dynamic wireless power control system also monitors the proximity sensors to determine if a user is detected by one or more antenna systems such that power levels must be reduced. The modular dynamic wireless power control system will have invoked an initial transmission power level setting that was a default for the convertible information handling system upon boot up. That initial power control level may be set at a nominal level at 925 for operation. In an example embodiment, before an orientation mode is determined, a lower transmission power level limitation for SAR exposure levels may be selected as the nominal level. In an example embodiment, this default nominal level may be the SAR transmission power level limitation for a tablet orientation mode which may have the strictest SAR exposure limitations. Upon a wake command from a dormant state or boot up, the most recent orientation mode stored in a memory device may be invoked instead or the default nominal level may be used.

Proceeding to 930, while the convertible information handling system is operating with active antenna systems, the modular dynamic wireless power control system may monitor one or more proximity detectors to determine if a user is proximate to the convertible information handling system. In a particular embodiment, the modular dynamic wireless power control system may determine if the proximity detector or detectors determine that a user is near one or more antenna systems of the information handling system. If user proximity is detected, flow may proceed to 935.

At 935, the modular dynamic wireless power control system may further reduce the permitted wireless transmission power levels for the convertible information handling system in accordance with the added power reduction determined from a power table. One example embodiment of a power table that may be utilized by the modular dynamic wireless power control system is shown above in Table 1. As described before, it is understood that the entries in Table 1 are only exemplary for purposes of discussion of FIG. 9 and any approximate orientation value ranges or any power level adjustments or additional modifications may be utilized. Further, different maximum SAR transmission power limits may be set for various orientation modes that differ from those shown in Table 1. If the nominal power level limitation for maximum transmission power is set to the level allowed for a tablet orientation mode, for example at 925, then the modular dynamic wireless power control system may further reduce permitted power level by the amount shown in Table 1 for the proximity context in an example embodiment. In a further example embodiment, the further reduced SAR transmission power level may be specified for a particular antenna system or antenna systems in the proximity context depending on which antenna system is near to a detected user.

Flow will return to 930 to monitor for ongoing user proximity or for whether another detection of user proximity has occurred. The proximity sensor detection is an ongoing monitoring feature of the modular dynamic wireless power control system in any orientation mode according to some embodiments. Example embodiments are discussed herein.

If no proximity of a user is detected near the convertible information handling system at 930, flow returns to 925 where the maximum SAR transmission power limits are again maintained at the nominal level such as used with tablet orientation mode or another lower SAR power transmission level limit.

Proceeding to 940 of the present embodiment, sensor data may be received, such as through an accumulator sensor hub, relating to orientation of the convertible information handling system, docking status, and the like. Multiple orientation sensors, docking sensors, and other hardware sensors in the convertible information handling system, including duplicate types of sensors as described in more detail above in several embodiments, may send data to the sensor hub or other aggregator of hardware sensor data. The sensor hub collects this data and may perform a fusion and grooming of the raw sensor data into a useable form of positional data for the convertible information handling system similar to described above. A similar function may be applied to sensors in a dual screen housing information handling system having one or two display screens in those housings according to other embodiments.

At 940, the modular dynamic wireless power control system determines whether a change is detected in the orientation mode. In an example embodiment, a motion sensor such as an accelerator may indicate a change in configuration or other orientation parameter which indicates that an orientation mode may be changing. Changes in other sensors or a docking status may also be detected. If no change occurs to the orientation mode, the modular dynamic wireless power control system will return to 925 to maintain the nominal level of maximum SAR transmission power limits and to monitor for proximity detection.

If a change in orientation mode is detected at 940, flow proceeds to 945 where the modular dynamic wireless power control system will determine if the change results in a tablet orientation mode. In an example embodiment, the tablet orientation mode corresponds with the most restrictive SAR transmission power level limits, so determination of whether one or more of the tablet orientation modes is triggered may determine whether deviation from the nominal transmission power level limit is warranted. If the change yields a tablet orientation mode or returns to a tablet orientation mode, flow returns to 925 to maintain the nominal level of SAR transmission power limitation. If a different orientation mode is detected, then flow proceeds to 950.

At 950, the modular dynamic wireless power control system will detect whether the docking status has been triggered to indicate that the display screen has been undocked from keyboard base indicating a use of the display screen side of the convertible information handling system as a tablet device. If the tablet display screen is undocked from the keyboard base, flow returns to 925 to maintain SAR power level limitations at the nominal level for a tablet orientation mode. If, however, the docking sensor does not detect an undocked tablet display screen flow may proceed to 960.

At 960, the modular dynamic wireless power control system determines that another orientation mode is operating. The modular dynamic wireless power control system will instruct the wireless adapter or adapters for the one or more antenna systems to permit transmission power to the level as described in the power table as the SAR transmission power limit for that orientation mode. For example, the power table embodiment of Table 1 above may determine a higher maximum transmission power level if the orientation mode is determined to be a laptop orientation mode, a tent orientation mode, or an easel orientation mode. As before, since those modes in the example embodiment of Table 1 are treated similarly with respect to SAR power level limits, the new power level may be set to the higher level in one embodiment. In other embodiments, orientation mode configurations may have several varied maximum SAR power level limits and the modular dynamic wireless power control system may adjust according to the orientation mode determined.

Proceeding to 965, the modular dynamic wireless power control system may monitor one or more proximity detectors similar to embodiments herein. However, the modular dynamic wireless power control system has a different maximum SAR power level limitation due to a different orientation mode. The modular dynamic wireless power control system may determine if a user is proximate to the convertible information handling system while a different SAR transmission power limitation level is in effect for a different orientation mode. In a particular embodiment, the modular dynamic wireless power control system may determine via the proximity detector or detectors whether that a user is near one or more specified antenna systems of the information handling system. If user proximity is detected, flow may proceed to 970.

At 970, the modular dynamic wireless power control system may further reduce the permitted wireless transmission power levels for the convertible information handling system in accordance with the addition reduction determined from a power table. One example embodiment of a power table that may be utilized by the modular dynamic wireless power control system is shown above in Table 1. If the SAR transmission power level limitation for maximum transmission power is set to the level allowed as determined for each of the orientation modes, then the modular dynamic wireless power control system may further reduce permitted power level limits by the amount shown in Table 1 for the proximity context upon a proximity detection event. In a further example embodiment, the further reduced SAR transmission power level limit may be specified for a particular antenna system or antenna systems in the proximity context depending on which antenna system is near to a detected user.

Flow will return to 965 to monitor for ongoing user proximity or for whether another detection of user proximity has occurred. If not, flow returns to 960 where upon adjustment to the SAR transmission power level limitation having occurred, flow may return to 940.

Upon return to 940, the modular dynamic wireless power control system will monitor for changes in orientation, docking sensor state or other factors in determining orientation mode or proximity mode. Flow will again proceed as before to determine the orientation mode and the corresponding maximum SAR power level limits for the determined orientation mode when a change in orientation mode is detected. In the example embodiment, if the modular dynamic wireless power control system detects a change in the orientation mode to the tablet mode, flow will proceed to 945. If, however, a laptop, tent, or easel orientation mode is detected, then flow will proceed to 960 to increase or otherwise maintain the maximum SAR power level limits to a new level in accordance with the newly detected orientation mode. If a tablet mode is detected, flow may return to 925 to a lower maximum SAR power level limits. As stated above, ongoing monitoring by the modular dynamic wireless power control system may also occur for dynamic data transmission levels and data priority levels. Dynamic changes to data transmission levels or data priority may relate to dynamically changed apportionment of cumulative instantaneous transmit power levels between active antenna systems as described in embodiments herein.

In some embodiments, the modular dynamic wireless power control system may switch between two levels of maximum SAR power level limit. In other embodiments, the modular dynamic wireless power control system such as described in the embodiments herein may dynamically switch between a plurality of maximum SAR power level limits as orientation modes or proximity modes are changed. Similarly and as described above, application of the modular dynamic wireless power control system as in FIG. 9 may be applied to a hinged dual tablet information handling system or a single screen, dual display screen housing information handling system where one display screen housing may replace the keyboard base in the determination of the orientation mode or proximity mode and application of power control as understood.

It is understood that the methods and concepts described in the algorithms above for FIG. 8 and FIGS. 9-1 and 9-2 may be performed in any sequence or steps may be performed simultaneously in some embodiments. It is also understood that in some varied embodiments certain steps may not be performed at all or additional steps not recited in the above figures may be performed. It is also contemplated that variations on the methods described herein may also be combined with portions of any other embodiments in the present disclosure to form a variety of additional embodiments. For example, aspects of FIGS. 8, 9-1, and 9-2 may be modified as understood by those of skill to implement variations described therein from either figure embodiment.

In some embodiments, dedicated hardware implementations such as application specific integrated circuits, programmable logic arrays and other hardware devices can be constructed to implement one or more of the methods described herein or portions of one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The device or module can include software, including firmware embedded at a device, such as an Intel® Core™ or ARM® RISC brand processors, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A convertible information handling system comprising:
   a wireless adapter for communicating on an antenna system;
   a processor executing code instructions for a modular dynamic wireless power control system for detecting an active wireless link operating via a first antenna system and a first orientation mode, wherein the transmission power of the first antenna system is limited to a regulatory safety maximum depending on orientation;
   the processor determining the permitted regulatory safety maximum transmission power for the first orientation mode for the information handling system;
   the processor determining relative transmission activity levels for the information handling system relative to the first active wireless link and the second active wireless link, including a first wireless link data rate transmission level for the first antenna system and a second wireless link data rate transmission level for a second antenna system; and
   the modular dynamic wireless power control system instructing the wireless interface adapter controller to increase transmission power to the first antenna and decrease transmission power to the second antenna relative to the regulatory safety maximum power level when the first wireless link data rate transmission level is greater than the second wireless link data rate transmission level.

2. The information handling system of claim 1, further comprising:
the processor detecting a change in orientation to a second orientation mode; and
the modular dynamic wireless power control system instructing the wireless adapter controller to decrease the permitted regulatory safety maximum transmission power to that associated with the second orientation mode upon detecting the second orientation mode, wherein the second orientation mode is a tablet mode.

3. The information handling system of claim 1, wherein the convertible information handling system has a 360 degree hinge.

4. The information handling system of claim 1, further comprising:
the modular dynamic wireless power control system detecting an undocking of a tablet head of the information handling system from a tablet base; and
the modular dynamic wireless power control system instructing the wireless adapter controller to decrease transmission power to the antenna system to the permitted regulatory safety maximum transmission power for a tablet upon detecting the undocked tablet head.

5. The information handling system of claim 1, further comprising:
a sensor hub detecting orientation of a tablet head and a tablet base of the reconfigurable information handling system relative to one another to determine the first orientation mode.

6. The information handling system of claim 1, further comprising:
a sensor hub detecting orientation of a tablet head and a tablet base of the reconfigurable information handling system relative to one another to determine the second orientation mode.

7. The information handling system of claim 1, further comprising:
a sensor hub and a plurality of sensors including an orientation sensor.

8. A computer implemented method comprising:
executing code instructions, via a processor in a convertible information handling system, for a modular dynamic wireless power control system for detecting an active wireless link operating via a first antenna system and a first orientation mode, wherein the transmission power of the first antenna system is limited to a regulatory safety maximum depending on orientation;
detecting a change in orientation to a second orientation mode;
determining the permitted regulatory safety maximum transmission power for the second orientation mode that is lower than permitted regulatory safety maximum transmission power for other orientation modes via the modular dynamic wireless power control system;
instructing a wireless adapter controller to decrease the permitted regulatory safety maximum transmission power for the second orientation mode upon detecting the second orientation mode, wherein the second orientation mode is a tablet mode;
determining a plurality of wireless link data rate transmission levels for transmission via each of a first active wireless link and a second active wireless link; and
dynamically adjusting the transmission power between the first antenna system and a second, co-located antenna system relative to the regulatory safety maximum power level based a ratio between the wireless link data rate transmission levels for transmission via each of the first active wireless link and the second active wireless link.

9. The method of claim 8, wherein the second orientation mode is a tablet mode.

10. The method of claim 8, wherein the second orientation mode is an undocked tablet head from a tablet base of the convertible information handling system.

11. The method of claim 8, further comprising:
dynamically adjusting regulatory safety maximum power level based on changes in the orientation mode between the second orientation mode and other orientation modes including the first orientation mode.

12. The method of claim 8, further comprising:
monitoring the plurality of wireless link data rate transmission levels for transmission via each of the first active wireless link, the second active wireless link, and one or more additional active wireless links corresponding changes in the ratio between wireless link data rate transmission levels for the first active wireless link, the second active wireless link, and the one or more additional active wireless links.

13. The method of claim 8, further comprising:
accessing a cutback table of permitted power levels in co-location operation modes between the first active wireless link and the second active wireless link to determine permitted power levels at each of the first antenna system and the second, co-located antenna system.

14. The method of claim 8, further comprising:
detecting a change in orientation to the first orientation mode;
instructing the wireless adapter controller to increase the permitted regulatory safety maximum transmission power to that corresponding to the first orientation mode.

15. The method of claim 8, wherein the orientation modes include a laptop mode, a tablet mode, a tent mode, and an easel mode.

16. A convertible information handling system comprising:
a wireless adapter for communicating on an antenna system;
a processor executing code instructions for a modular dynamic wireless power control system for detecting a plurality of active wireless links operating via a plurality of antenna systems co-located on the convertible information handling system, wherein the total transmission power of the plurality of antenna systems is limited to a regulatory safety maximum depending on orientation;
the processor determining the permitted regulatory safety maximum transmission power for the first orientation mode for the information handling system;
the processor determining a simultaneous transmit configuration mode and wireless link data rate transmission levels for the plurality of active wireless links and accessing a cutback table of permitted power levels for the simultaneous transmit configuration mode; and
the wireless interface adapter dynamically adjusting the transmission power between the plurality of antenna systems co-located on the information handling system relative to the regulatory safety maximum power level based on the cutback table of permitted power levels.

17. The information handling system of claim 16, further comprising:

the processor monitoring for changes in wireless link data rate transmission levels or active wireless links and accessing a cutback table of permitted power levels for the corresponding simultaneous transmit configuration mode in response.

18. The information handling system of claim 16, further comprising:

the processor detecting a change in orientation to a second orientation mode;

the modular dynamic wireless power control system instructing the wireless adapter controller to decrease the permitted regulatory safety maximum transmission power for the second orientation mode upon detecting the second orientation mode, wherein the second orientation mode is a tablet mode.

19. The information handling system of claim 16, further comprising:

the processor detecting a user proximity via a proximity detector near one of the plurality of wireless links and instructing the wireless adapter controller to decrease the permitted regulatory safety maximum transmission power for the plurality of wireless links.

20. The wireless adapter front end of claim 16, further comprising:

the processor detecting a user proximity via a proximity detector near one of the plurality of wireless links and dynamically adjusting the transmission power to the other of the plurality of antenna systems co-located on the information handling system relative to the regulatory safety maximum power level based on the cutback table of permitted power levels.

* * * * *